US010432810B2

(12) United States Patent
Fujiwara

(10) Patent No.: US 10,432,810 B2
(45) Date of Patent: Oct. 1, 2019

(54) SCANNER AND NON-TRANSITORY COMPUTER-READABLE RECORDING MEDIUM FOR IMAGE PROCESSING DEVICE

(71) Applicant: BROTHER KOGYO KABUSHIKI KAISHA, Nagoya, Aichi (JP)

(72) Inventor: Shingo Fujiwara, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/192,869

(22) Filed: Nov. 16, 2018

(65) Prior Publication Data

US 2019/0158692 A1 May 23, 2019

(30) Foreign Application Priority Data

Nov. 20, 2017 (JP) ................................. 2017-222956

(51) Int. Cl.
*H04N 1/00* (2006.01)

(52) U.S. Cl.
CPC ....... *H04N 1/00702* (2013.01); *H04N 1/0057* (2013.01); *H04N 1/00734* (2013.01); *H04N 1/00777* (2013.01)

(58) Field of Classification Search
CPC ............. H04N 1/00702; H04N 1/0057; H04N 1/00777; H04N 1/00734
See application file for complete search history.

(56) References Cited

U.S. PATENT DOCUMENTS

| 7,526,969 | B2 * | 5/2009 | Schoen | ..................... | B65H 7/02 |
| | | | | | 271/258.01 |
| 8,413,981 | B2 * | 4/2013 | Tomono | ............. | G06K 19/0723 |
| | | | | | 271/145 |
| 9,796,547 | B2 * | 10/2017 | Yabune | ..................... | B65H 7/14 |

(Continued)

FOREIGN PATENT DOCUMENTS

| JP | H7-291485 A | 11/1995 |
| JP | 2009-084003 A | 4/2009 |
| JP | 2009-256073 A | 11/2009 |

OTHER PUBLICATIONS

User's manual of "DR-XIOC"(Canon), pp. 8-17, issued in 2007, with English translation.

*Primary Examiner* — Neil R McLean
(74) *Attorney, Agent, or Firm* — Scully, Scott, Murphy & Presser, PC

(57) ABSTRACT

A scanner has a controller configured to control a conveyer to convey original sheets one by one along a conveying passage, control an image sensor to optically read the original sheet, determine a detection position of the original sheet based on an output signal of the detection sensor, obtain target image data containing at least a partial image of the original sheet at a detection area including the detection position, determine whether the particular fixed object exists at the detection area of the original sheet by analyzing the target image data with use of particular image information, interrupt conveyance of the original sheet by the conveyer when the detection position is determined, based on an output signal of the detection sensor, to be an overlapped position and when it is detected, by analyzing the target image data, that the particular fixed object does not exist at the detection area.

16 Claims, 14 Drawing Sheets

WHEN OVERLAP-FEEDING IS NOT OCCURRING

(56) References Cited

U.S. PATENT DOCUMENTS

2008/0036139 A1\* 2/2008 Reyner .................. B65H 7/12
　　　　　　　　　　　　　　　　　　　　　　271/262
2009/0085284 A1　4/2009 Tsuruoka \* cited by examiner

| No. | DISTANCE DATA |
|---|---|
| 1 | Ua,Ra,Ba,La |
| 2 | Ub,Rb,Bb,Lb |
| 3 | Uc,Rc,Bc,Lc |

VIRTUAL LABEL AREA BASED ON CODE IMAGE INFORMATION CIa

VIRTUAL LABEL AREA BASED ON CODE IMAGE INFORMATION CIb

VIRTUAL LABEL AREA BASED ON CODE IMAGE INFORMATION CIc

SCANNER AND NON-TRANSITORY COMPUTER-READABLE RECORDING MEDIUM FOR IMAGE PROCESSING DEVICE

CROSS-REFERENCE TO RELATED APPLICATIONS

This application claims priority under 35 U.S.C. § 119 from Japanese Patent Application No. 2017-222956 filed on Nov. 20, 2017. The entire subject matter of the application is incorporated herein by reference.

BACKGROUND

Technical Field

The present disclosures relate to a scanner configured to convey multiple original sheets one by one to scan an image thereon, and a non-transitory computer-readable medium storing instructions for an image processing device configured to control the scanner.

Related Art

There has been known a scanner provided with a conveying part which is configured to convey multiple original sheets one by one. In such a conveying part, the multiple original sheets may be conveyed such that one sheet is overlapped with another (known as "overlap-feeding" of the original sheets). Due to such an overlap-feeding of the original sheets, inappropriate scan data may be generated. Therefore, conventionally, a status of the overlapping overlap-feeding is detected and conveying conveyance of the original sheets of the original document is interrupted when occurrence of the overlap-feeding is detected.

SUMMARY

Conventionally, there is known a technique using an ultrasonic sensor to detect occurrence of the overlap-feeding is occurring. That is, damping of ultrasonic wave passed through the sheet(s) which is being conveyed is measured, and based on a measured result, whether the overlap-feeding is occurring or not is detected. According to such a technique, however, when multiple labels or IC tags are attached on the surface of the original sheet, the damping of the ultrasonic wave is relatively large at portions where the labels or IC tags are attached and may be determined that the overlap-feeding is occurring. In order to avoid such a false detection, portions where the labels or IC tags could exist are determined to be non-detection areas in advance, and the detection of the overlap-feeding is not executed on the non-detection areas.

According to the above configuration, however, the false detection of the overlap-feeding may not be prevented sufficiently. For example, if the labels or IC tags are attached outside the non-detection areas, or if the non-detection areas have not been determined in advance, the false detection of the overlap-feeding may not be prevented.

According to aspects of the present disclosures, there is provided a scanner, which is provided with a conveyer configured to sequentially convey multiple original sheets along a conveying passage, an image sensor arranged on the conveying passage and configured to optically read the original sheet being conveyed along the conveying passage, a detection sensor configured to detect physical information regarding the original sheet being conveyed, a memory configured to store particular image information regarding a particular image, the particular image being an image indicated on a particular fixed object which is fixed to the original sheet in an overlapped state and a controller. The controller is configured to perform controlling the conveyor to convey original sheets one by one along the conveying passage, controlling the image sensor to optically read the original sheet, determining a detection position of the original sheet based on an output signal of the detection sensor, obtaining target image data containing at least a partial image of the original sheet at a detection area including the detection position, determining whether the particular fixed object including the particular image exists at the detection area of the original sheet by analyzing the target image data with use of the particular image information in the memory, interrupting conveyance of the original sheet by the conveyer when the detection position is determined, based on an output signal of the detection sensor, to be an overlapped position and when it is detected, by analyzing the target image data, that the particular fixed object does not exist at the detection areal and outputting image data representing an image of the original sheet. when the detection position is determined, based on the output signal of the detection sensor, to be the overlapped position and when the detection area is detected, by analyzing the target image data, that the particular fixed object exists at the detection area.

According to aspects of the present disclosures, there is provided a non-transitory computer-readable recoding medium containing instructions to be executed by a controller of an image processing device, the image processing device is connected to a scanner which is provided with a conveying part, an image sensor, a detection sensor, the conveying part being configured to sequentially convey multiple original sheets along a conveying passage, the image sensor being arranged on the conveying passage and configured to optically read the original sheet being conveyed along the conveying passage, the detection sensor being configured to detect physical information regarding the original sheet being conveyed, the scanner being configured to output read image data based on an output signal of the image sensor. The instructions cause, when executed by the controller, the image processing device to perform obtaining particular image information regarding a particular image, the particular image being an image indicated on a particular fixed object which is fixed to the original sheet in an overlapped state, receiving sensor information based on an output signal of the detection sensor, the sensor information indicating whether or not a detection position of the detection sensor of the original sheet being conveyed is an overlapped portion which overlaps with another object, receiving target image data containing at least a partial image of the original sheet at a detection area including the detection position, the target image data being received from the scanner, determining whether the particular fixed object including the particular image exists at the detection area of the original sheet by analyzing the target image data with use of the particular image information, transmitting interruption command to the scanner when the sensor information indicates that the detection position is the overlapped portion and when it is determined that a particular fixed object does not exists at the detection area, and generating original sheet image data representing an image of the original sheet with use of the target image data received from the scanner.

According to aspects of the present disclosures, there is provided a scanner, which is provided with a conveyer configured to sequentially convey a plurality of original sheets along a conveying passage, an image sensor arranged on the conveying passage and configured to optically read the original sheet being conveyed along the conveying passage, a detection sensor configured to detect physical information regarding the original sheet being conveyed, a communication interface and a controller. The controller is configure to perform transmitting read image data based on an output signal of the image sensor to an image processing device through the communication interface, transmitting sensor information indicating whether or not a detection position, on the original sheet being conveyed, of the detection sensor is an overlapped portion overlapping with another object to the image processing device through the communication interface, receiving interruption command, which is transmitted by the image processing device when the sensor information indicates that the detection position is the overlapped portion and when it is determined that a particular fixed object does not exist at the detection position, and interrupting conveyance of the original sheet by the conveyer when the interruption command is received.

BRIEF DESCRIPTION OF THE ACCOMPANYING DRAWINGS

Figure 2A:
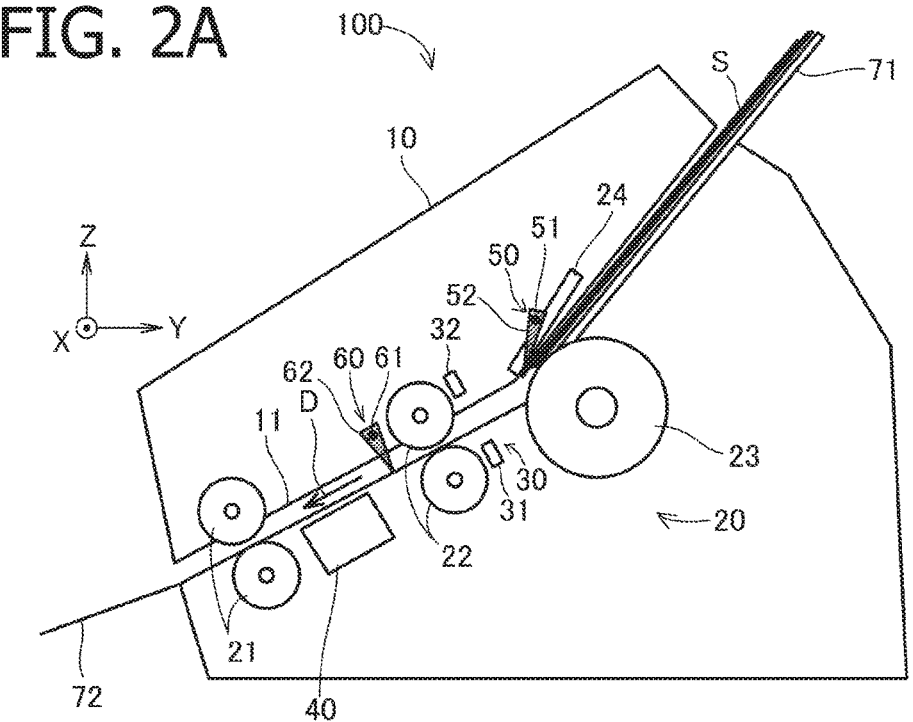
FIG. 2A is a side view of schematically showing configuration around a conveying passage of the a scanner of the image processing system shown in FIG. 1.
Figure 2B:
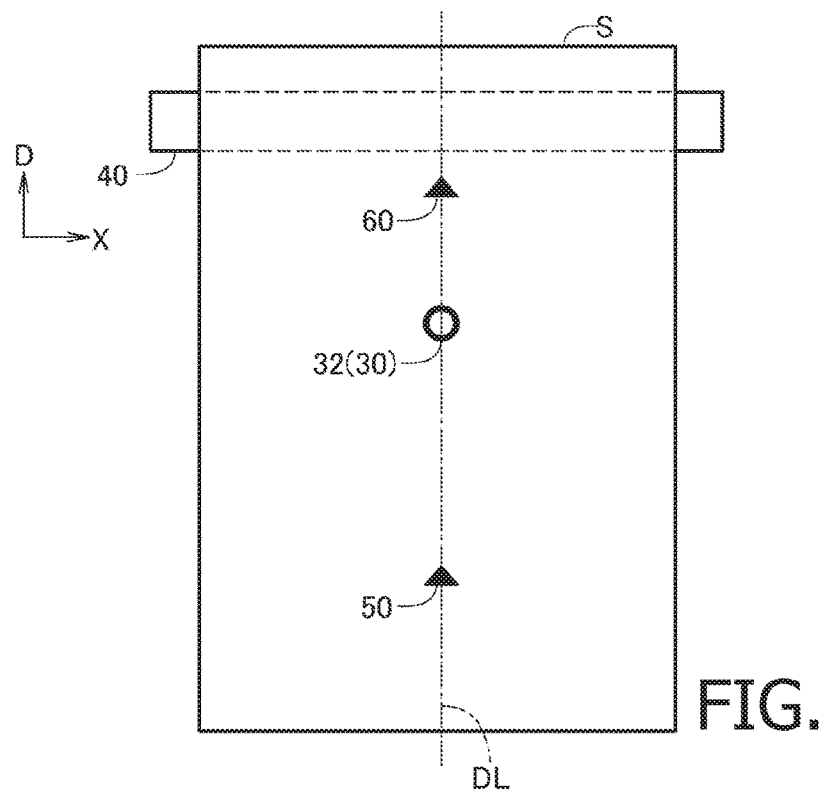

FIG. 2B schematically shows positions of an image sensor, a front sensor and a rear sensor relative to a conveyed original sheet when viewed from a back side of the original sheet.

Figure 3:
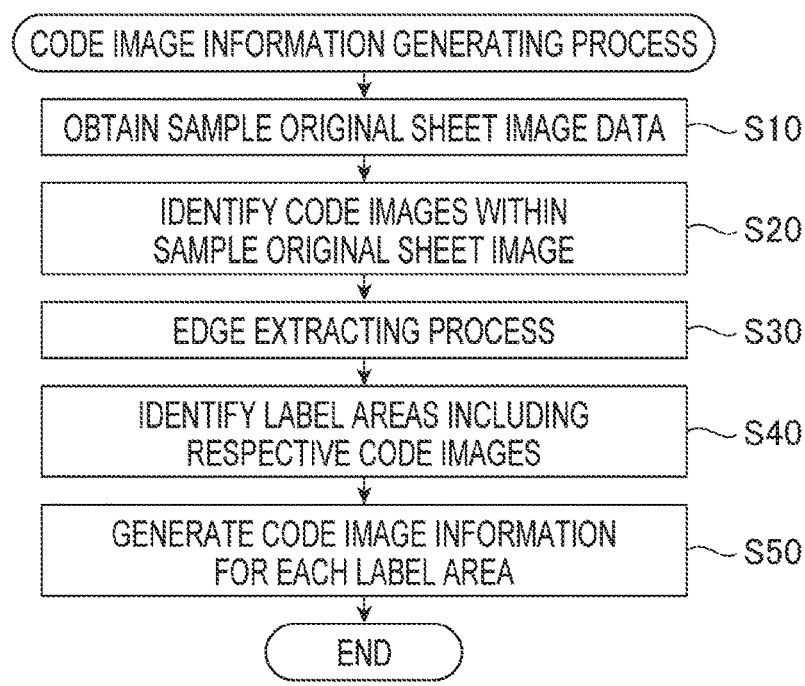

FIG. 3 is a flowchart illustrating a code image information generating process.

Figures 4, 5:
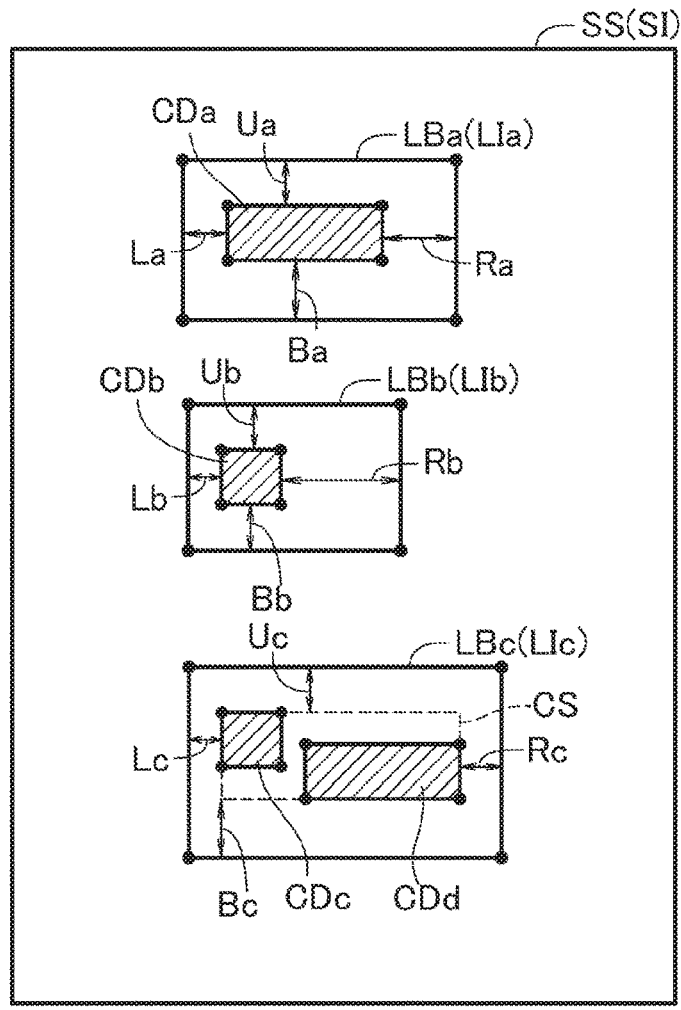

FIG. 4 shows an example of a sample original sheet.

FIG. 5 shows an example of a code image information group.

Figure 6A:
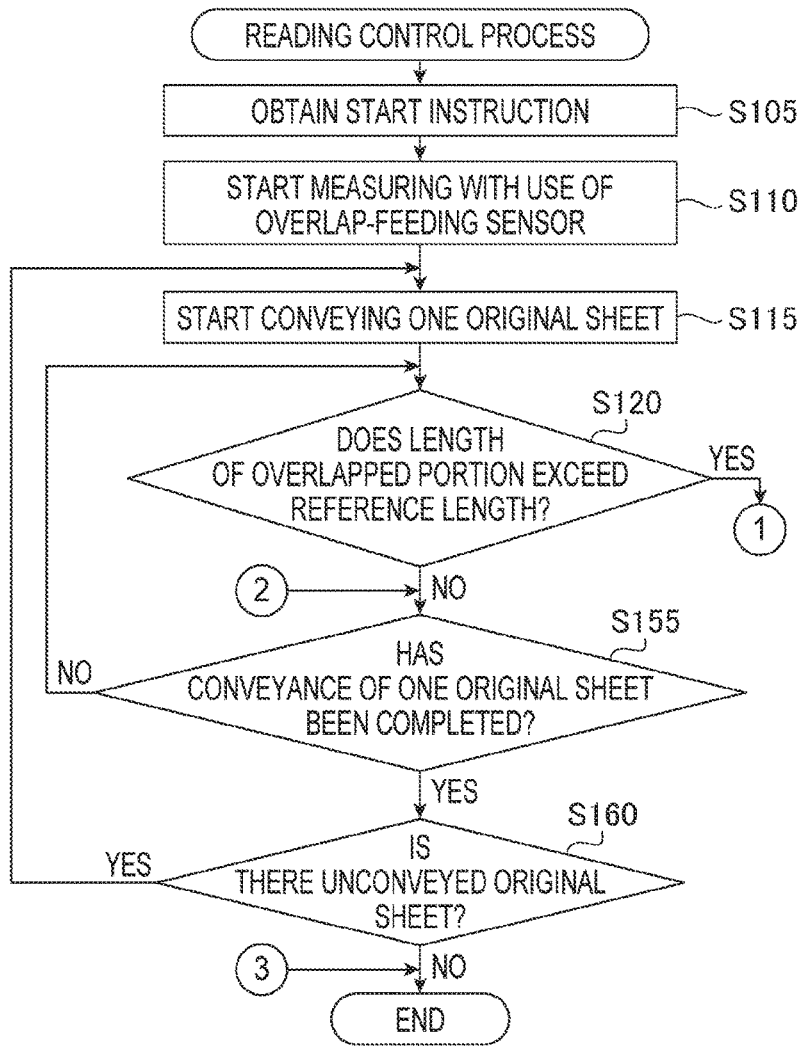
Figure 6B:
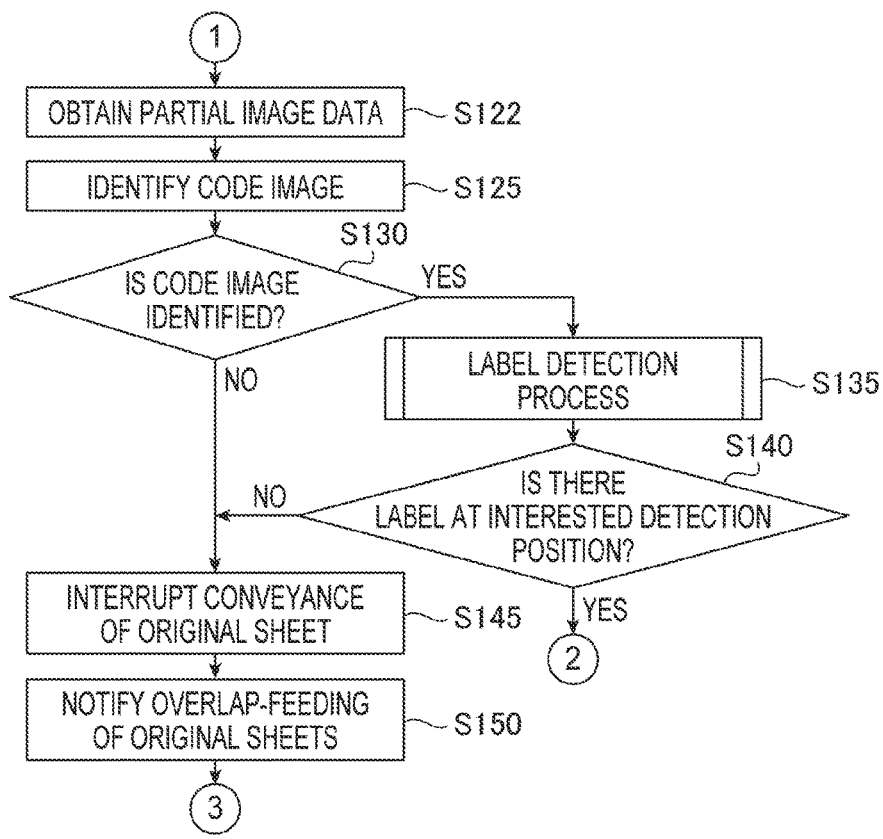

FIGS. 6A and 6B show a flowchart illustrating a reading control process according to the first illustrative embodiment of the present disclosures.

Figures 7A, 7B:
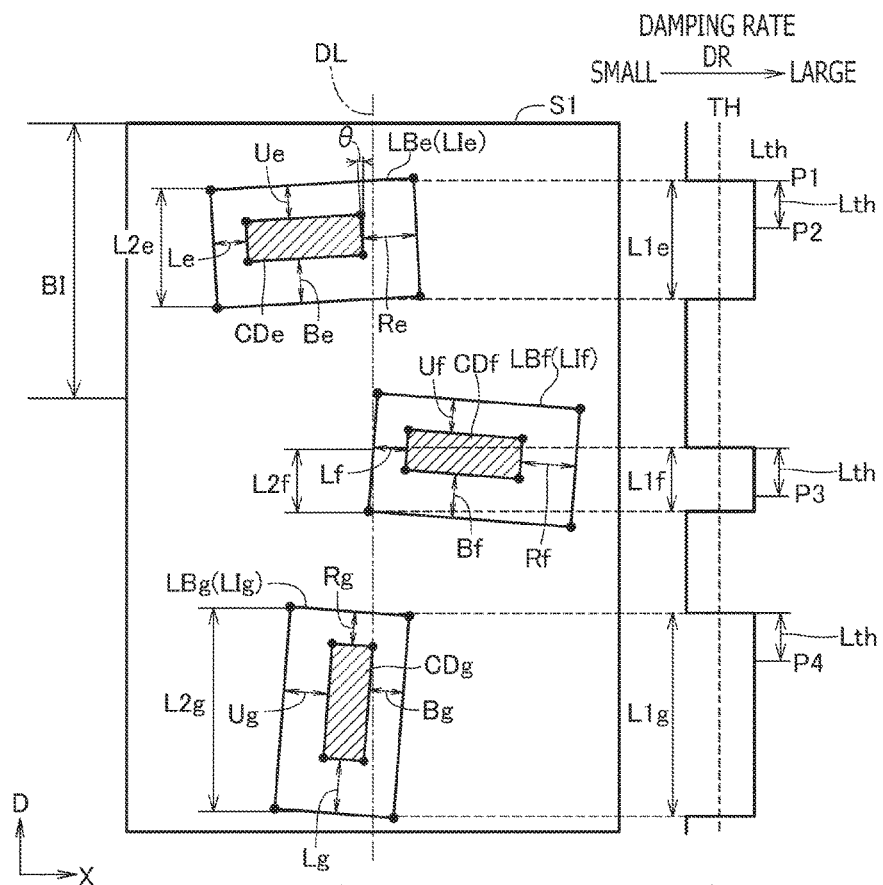

FIGS. 7A and 7B show a first example of measurement result of an overlap-feeding with respect an original sheet with use of an overlap-feeding sensor.

Figures 8A, 8B:
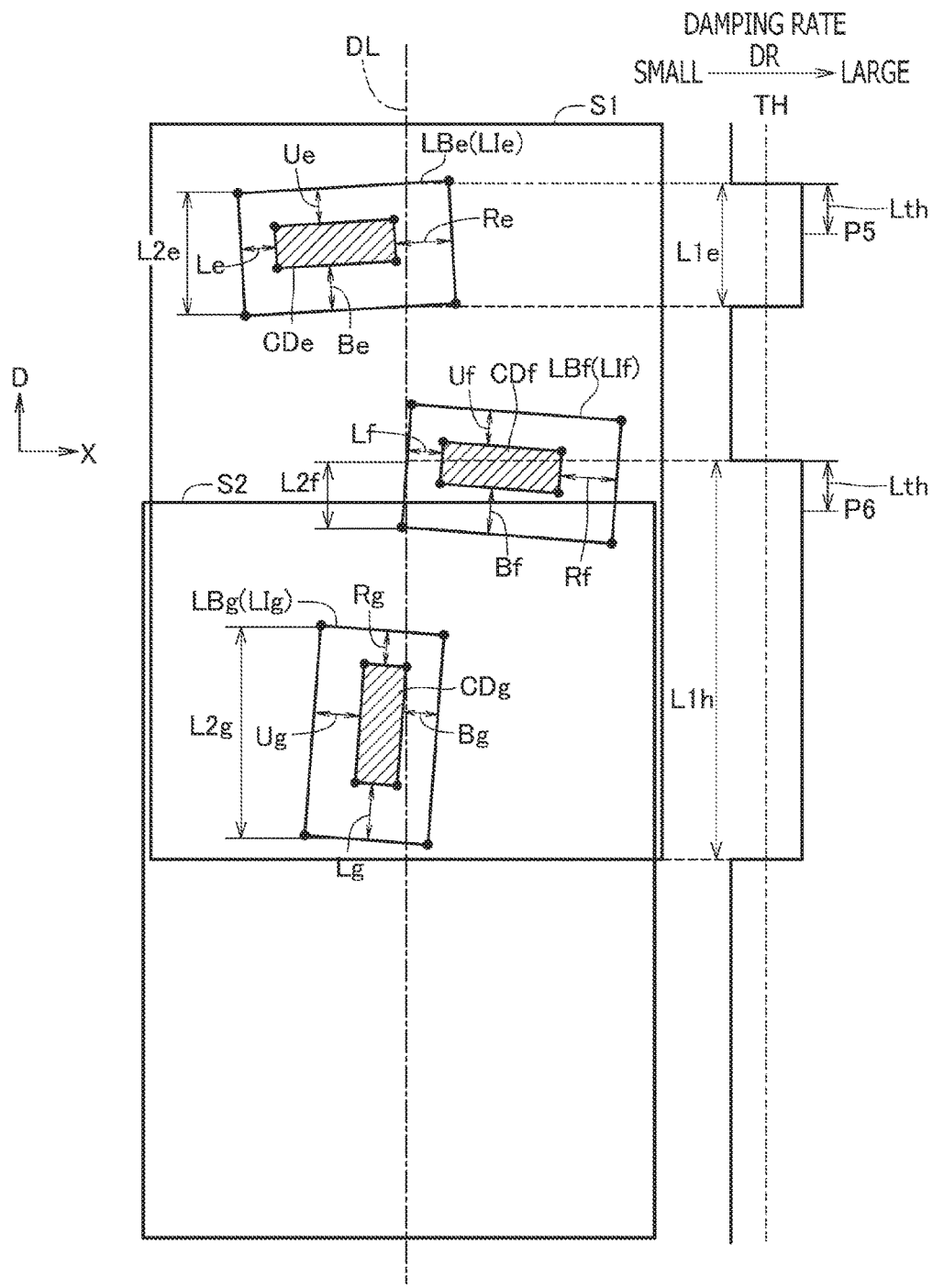

FIGS. 8A and 8B show a first example of measurement result of the overlap-feeding with respect original sheets with use of the overlap-feeding sensor.

Figure 9:
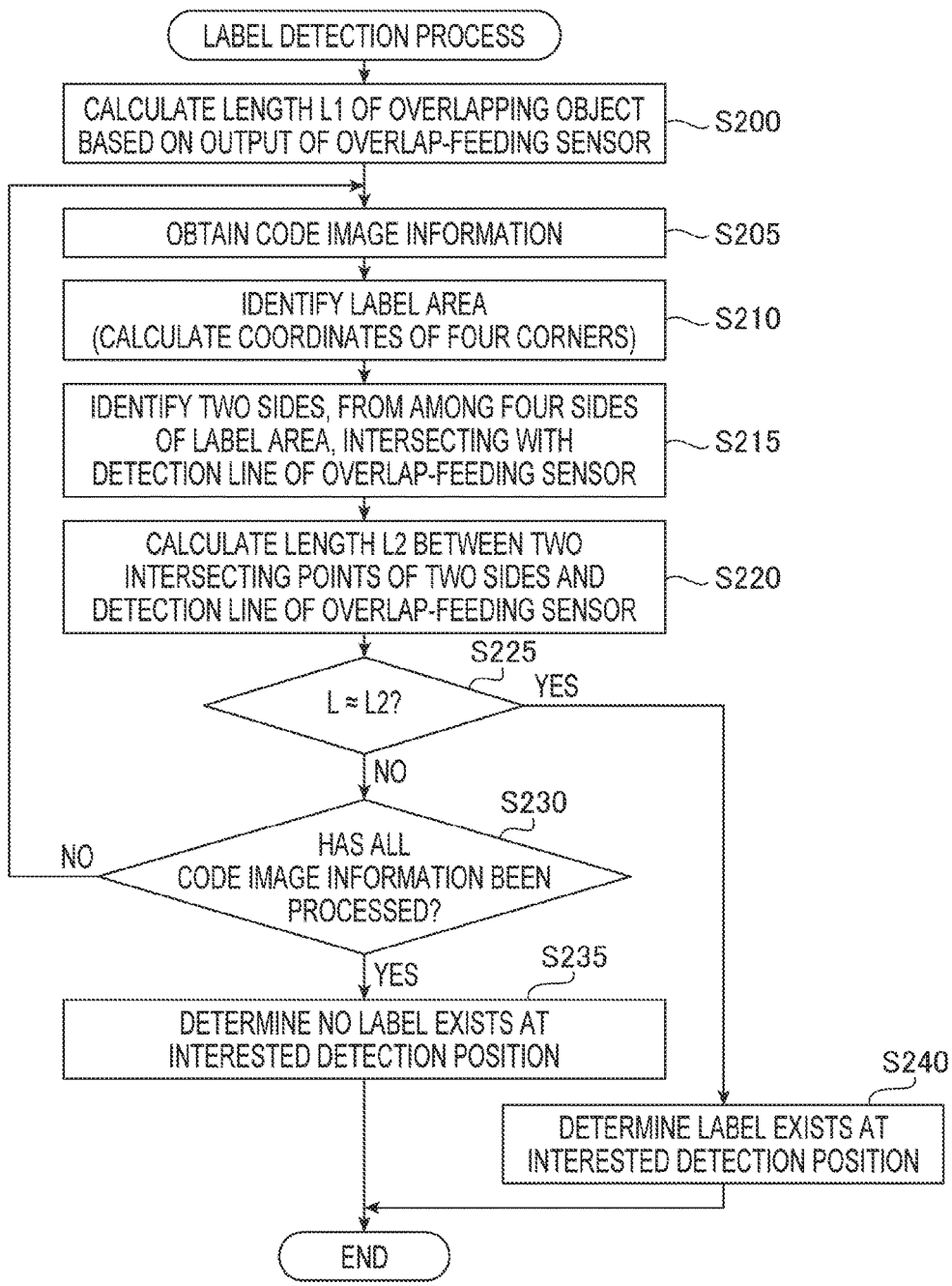

FIG. 9 is a flowchart illustrating a label detection process according to the first illustrative embodiment.

Figure 10A:
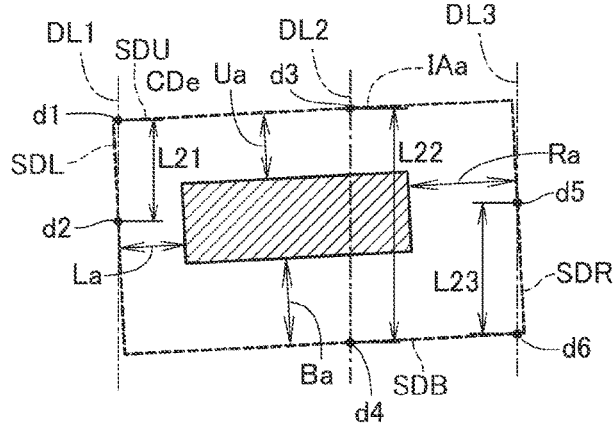
Figure 10B:
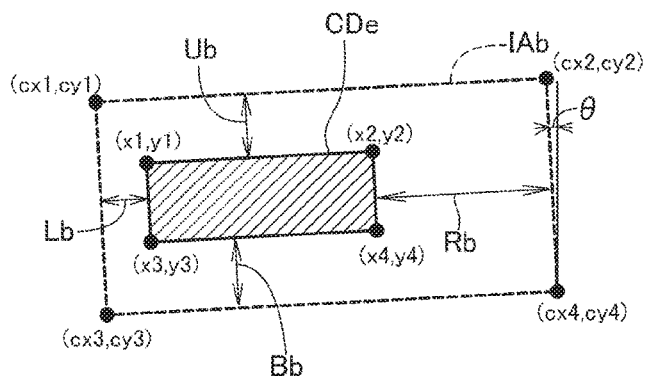
Figure 10C:
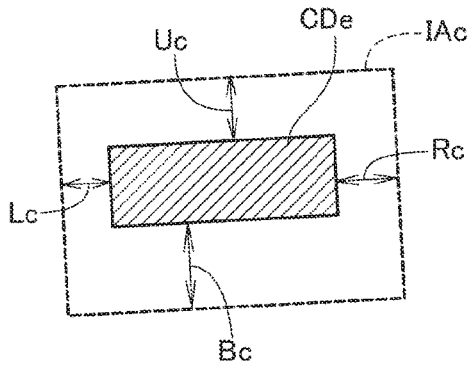

FIGS. 10A-10C illustrate identification of a label areas with use of code image information.

Figure 11:
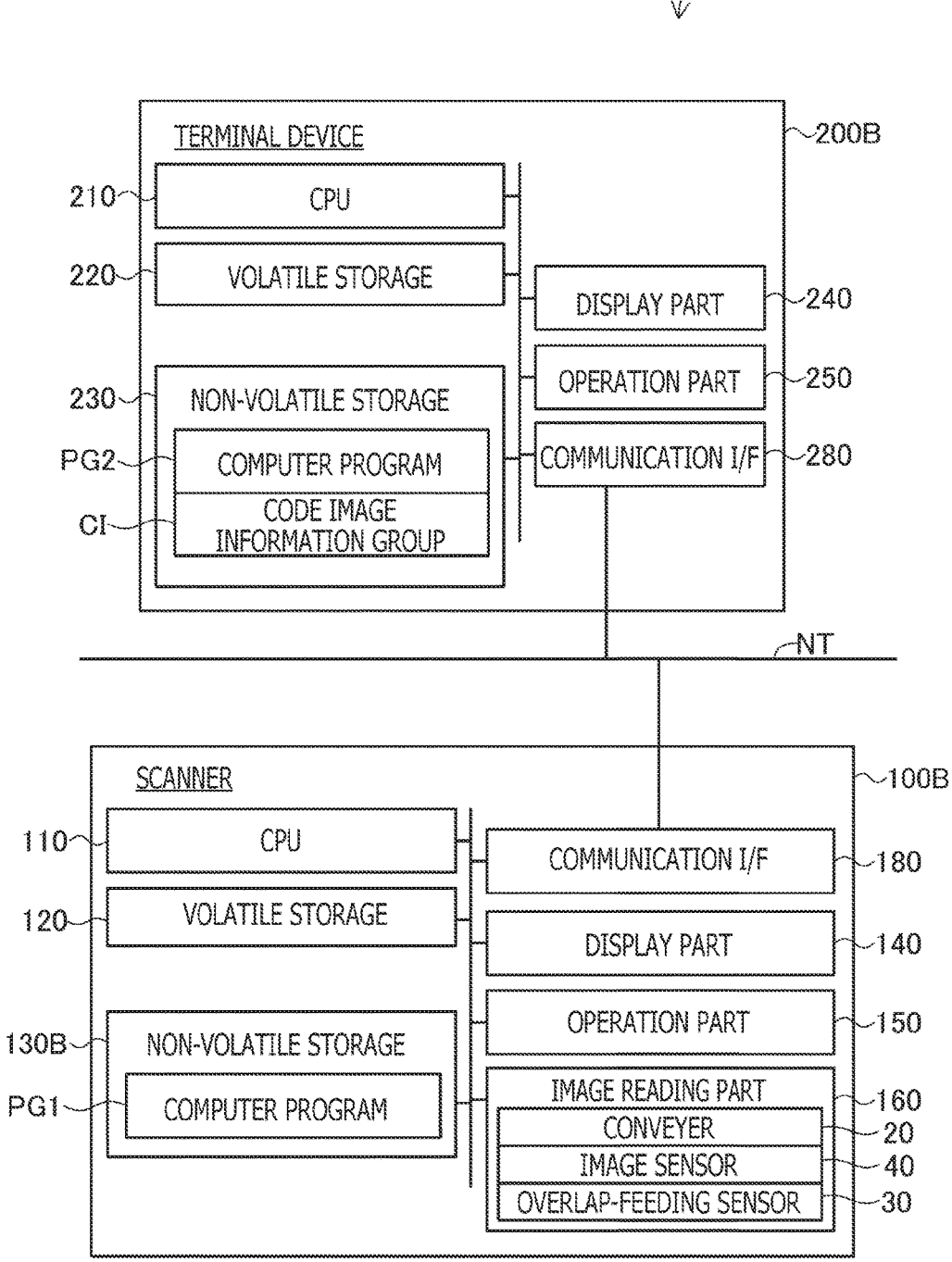

FIG. 11 is a block diagram schematically showing a configuration of an image processing system according to a second illustrative embodiment of the present disclosures.

Figure 12:
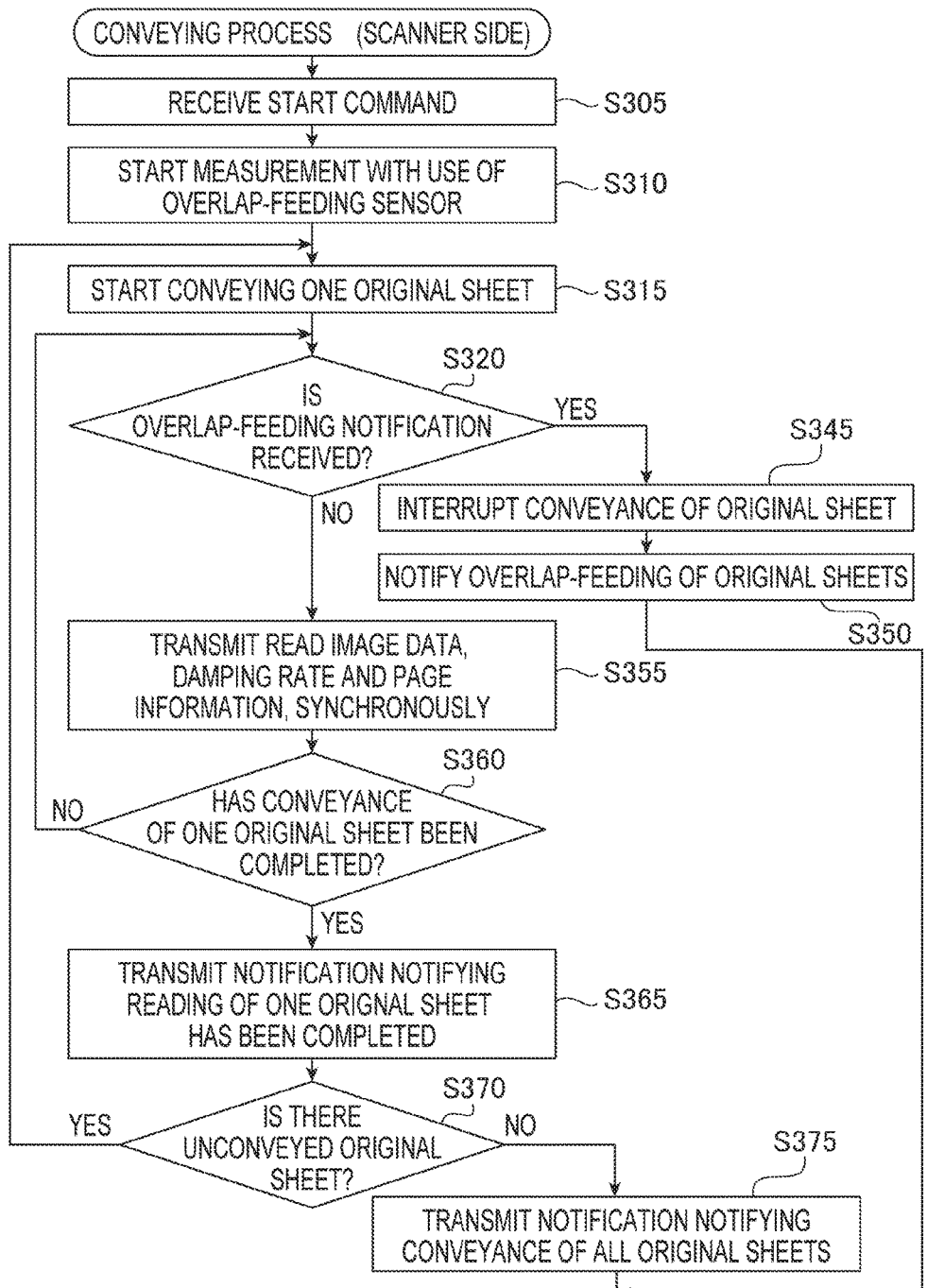

FIG. 12 is a flowchart illustrating a conveying process according to the second illustrative embodiment.

Figure 13A:
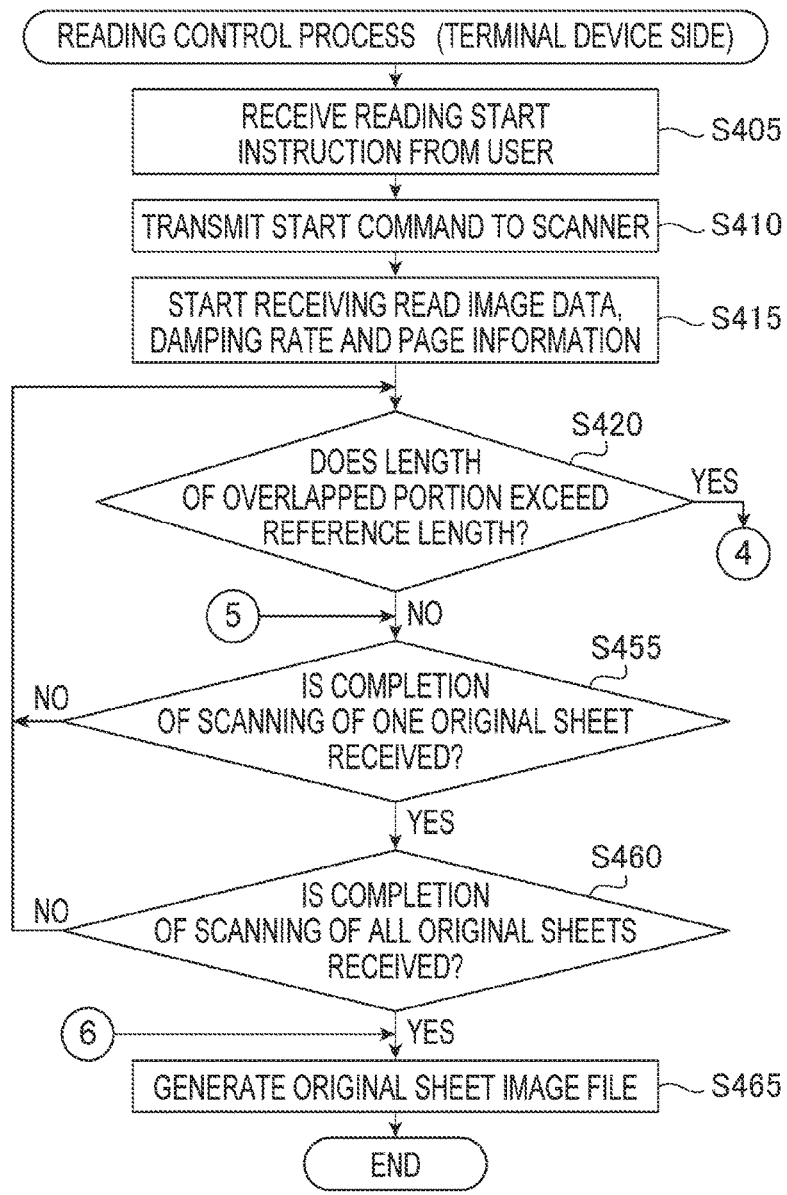
Figure 13B:
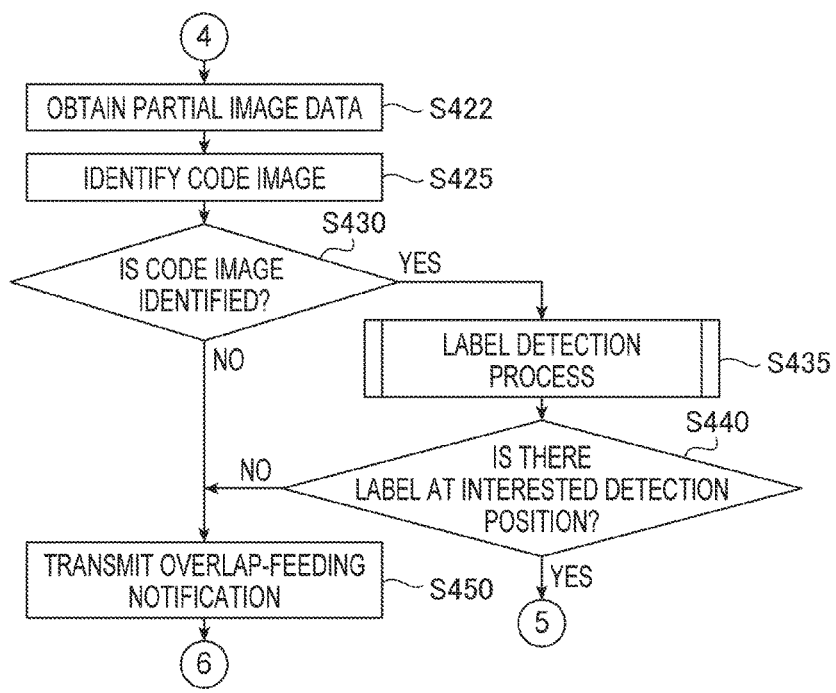

FIGS. 13A and 13B show a flowchart illustrating a reading control process according to the second illustrative embodiment.

DESCRIPTION OF THE EMBODIMENTS

A. First Embodiment

A-1. Configuration of Image Processing System 1000

Referring to accompanying drawings, an image processing system 1000 according to a first illustrative embodiment will be described.

Figure 1:
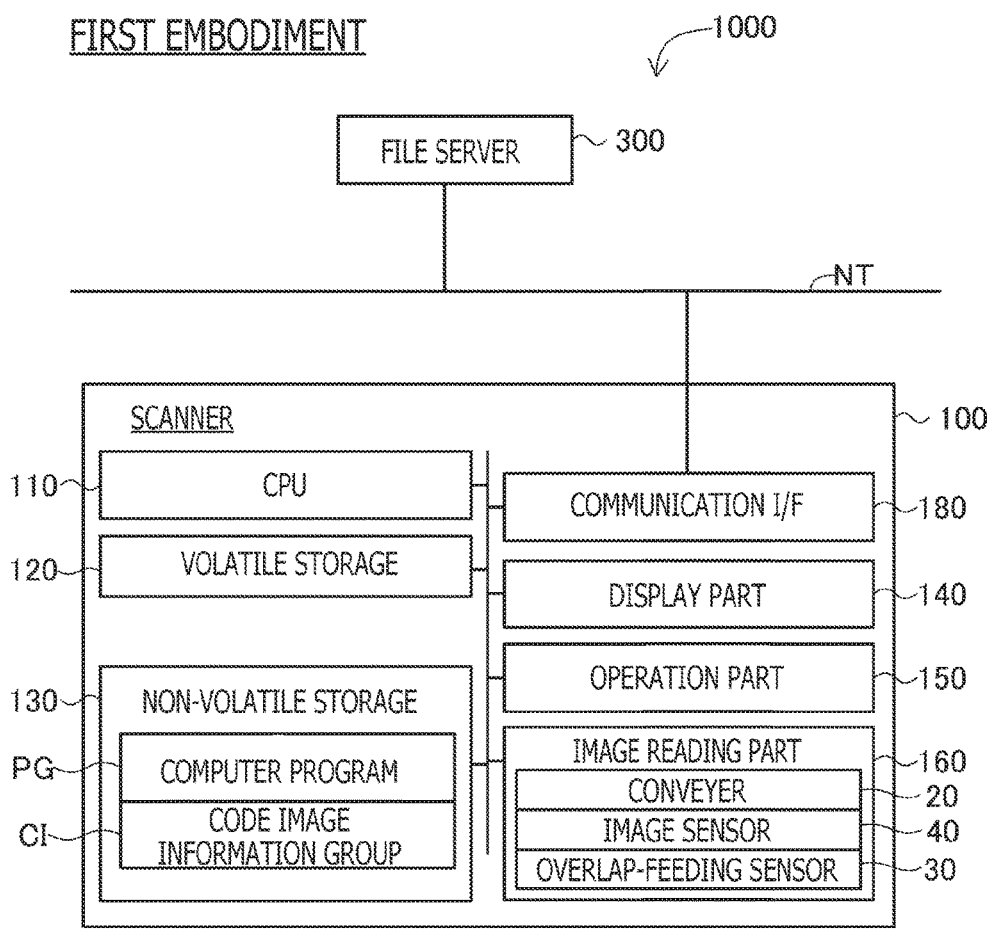
FIG. 1 is a block diagram schematically showing a configuration of an image processing system according to a first illustrative embodiment of the present disclosures.

As shown in FIG. 1, the image processing system 1000 includes a file server 300 and a scanner 100. The scanner 100 is provided with a CPU 110 serving as a controlling device to control entire operation of the scanner 100, a volatile storage 120 such as a DRAM, a non-volatile storage 130 such as a flash memory, a display part 140 such as an LCD, an operation part 150 including operation buttons and a touch panel, an image reading part 160 configured to read an original sheet and output read image data representing an image of the original sheet, and a communication I/F 180 configured to communicate with other devices such as the file server 300, a user's terminal device (not shown) and the like.

The volatile storage 120 is used as a buffer area for temporarily storing data when the CPU 110 executes processes. the non-volatile storage 130 stores a computer program PG and code image information group CI. The computer program PG is provided, for example, as being installed in the not-volatile storage 130 during manufacturing. Alternatively, the program PG may be provided as being stored in a DVD-ROM, or may be downloaded from a server. By executing the computer program PG, the CPU 110 executes a code image information generating process and a control process of the scanner 100 including a reading control process, which processes will be described later. It is noted that the code image information group CI is generated in the code image information generating process and used in the reading control process.

The image reading part 160 is provided with a conveyer 20 configured to convey the original sheet, an image sensor 40 configured to optically read the original sheet being conveyed, and the overlap-feeding sensor 30.

FIG. 2A shows a conveying passage 11 of the scanner 100 and a structure therearound. The conveying passage 11 is defined inside a housing 10 of the scanner 100 and are configured such that the original sheets S are conveyed therethrough. In the following description, terms "upstream" and "downstream" are used to indicate sides along the conveying passage 11 in a conveying direction D. The image sensor 40 is arranged on the conveying passage 11. The conveyer 20 is configured to convey multiple original sheets one by one along the conveying passage 11, from a sheet feed tray 71 arranged on the upstream side of the conveying passage 11 to a discharge tray 72 arranged on the downstream side of the conveying passage 11. As shown in FIG. 2A, an X-direction is defined to be a direction perpendicular to the conveying direction D and parallel to the original sheet S being conveyed. The X-direction will also be referred to as a main scanning direction.

The conveyer 20 is a so-called ADF (abbreviation of an Automatic Document Feeder) configured to automatically convey the multiple original sheets S one by one. The conveyer 20 has multiple rollers which are driven by a driving force of a not-shown motor. The multiple rollers include, from the upstream side to the downstream side, a sheet feed roller 23, a pair of conveying rollers 22 and a pair of discharging rollers 21. The sheet feed roller 23 is arranged at the vicinity of a downstream side end portion of the sheet feed tray 71. The sheet feed roller 23, in association with a separation pad 24, picks up one of the multiple original sheets S accommodated in the sheet feed tray 71, and feeds the picked-up original sheet S into the conveying passage 11 from the upstream side thereof. The discharging roller 21 is arranged on the conveying passage 11 at the vicinity of an upstream side end portion of the discharge tray 72. The conveying rollers 22 are arranged along the conveying passage 11 between the discharging rollers 21 and the sheet feed roller 23. The original sheet S introduced into the conveying passage 11 by the sheet feed roller 23 is further conveyed along the conveying passage 11 by the conveying rollers 22 and the discharging rollers 21, and finally discharged onto the discharge tray 72.

The conveyer 20 is further provided with a front sensor 50 and a rear sensor 60 which server as an original sheet sensor to detect presence or absence of the original sheet S at a position where the front sensor 50 and the rear sensor 60 are arranged.

The front sensor 50 is arranged on the sheet feed tray 71 at the vicinity of the sheet feed roller 23. The front sensor 50 has a rotatable swingable member 52 which is swingable (rotatable) about an axis 51 extending in parallel with the X-direction. When the original sheets S are accommodated in the sheet feed tray 71, the rotatable swingable member 52 is located at a position as indicated in FIG. 2A. When there are no original sheets S in the sheet feed tray 71, the rotatable swingable member 52 is displaced, with respect to the position indicated in FIG. 2A, to be slightly rotated counterclockwise. The front sensor 50 is configured to detect a location of the rotatable swingable member 52, thereby detecting whether the original sheets S are present or absent at the arranged position of the front sensor 50, or whether the original sheets S are placed on the sheet feed tray 71.

The rear sensor 60 is arranged on the conveying passage 11 between the conveying rollers 22 and the discharging rollers 21, and on the upstream side relative to the image sensor 40. Similar to the front sensor 50, the rear sensor 60 is provided with a rotatable swingable member 62 which is swingable (rotatable) about an axis 61 extending in a direction parallel to the X-direction. When the original sheet S is not located at the position where the rear sensor 60 is arranged, the rotatable swingable member 62 is located at a position as indicated in FIG. 2A. When the original sheet S is located at the position where the rear sensor 60 is arranged, the rotatable swingable member 62 is displaced, with respect to the position indicated in FIG. 2A, to be slightly rotated clockwise. The rear sensor 60 is configured to detect a location of the rotatable swingable member 62, thereby detecting whether the original sheet S is present or absent at the arranged position of the rear sensor 60.

In the following description, a state where the front sensor 50 detects that the original sheet S is located at the arranged position of the front sensor 50 will also be expressed that "the sensor 50 is in an ON state" and a state where the front sensor 50 detects that the original sheet S is not located at the arranged position of the front sensor 50 will also be expressed that "the sensor 50 is in an OFF state." The similar expressions will be used with respect to the states of the rear sensor 60.

The image sensor 5040 is a line sensor configured to read the original sheet S being conveyed by the conveyer 20 with use of a plurality of photoelectric conversion elements (e.g., CCD's or CMOS's) aligned in a line parallel to the X-direction. An example of such an image sensor 40 is a CIS (abbreviation of a Contact Image Sensor). The image sensor 40 is arranged along the conveying passage 11, between the discharging rollers 21 and the conveying rollers 22, and closer to the discharging rollers 21 than the conveying rollers 22. The image reading part 160 generates read image data based on an output signal of the image sensor 40 on a line basis, and output the same.

The overlap-feeding sensor 30 is for detecting the overlap-feeding state of the original sheets S. The overlap-feeding is a trouble that the original sheet S to be conveyed one by one is conveyed with another original sheet S being overlapped. The overlap-feeding sensor 30 is arranged on the upstream side relative to the conveying rollers 22, and at the vicinity of the conveying rollers 22. The overlap-feeding sensor 30 includes a transmitter 31 configured to transmit ultrasonic waves and a receiver 32 configured to receive the ultrasonic waves transmitted by the transmitter 31.

The receiver 32 is configured to output an electrical signal indicating an intensity of the received ultrasonic waves (i.e., a sound pressure) Wp. Based on the intensity Wp and an initial intensity of the ultrasonic waves, a damping rate DR of the ultrasonic waves can be measured. The transmitter 31 is arranged on a front surface side (i.e., on a side of a surface subject to be read) of the original sheet S being conveyed through the conveying passage 11, while the receiver 32 is arranged on a rear surface side of the conveyed original sheet S.

When there exists the original sheet S in the conveying passage 11 at the position of the overlap-feeding sensor 30, the ultrasonic waves transmitted by the transmitter 31 propagate through the original sheet S and received by the receiver 32. When the overlap-feeding of the original sheets S is occurring, the damping rate DR of the ultrasonic waves is much higher than that when the overlap-feeding state of the original sheets S is not occurring.

Therefore, when the overlap-feeding of the original sheets S is occurring, the damping ratio DR of the ultrasonic waves propagating through an overlapped portion where two or more original sheets overlap becomes larger than a threshold value TH. The damping rate DR of the original sheet S on which a fixed object (e.g., a label) is not fixed is smaller than the threshold value TH. The damping rate DR of the original sheet S on which the fixed object is fixed is larger than the threshold value TH.

In FIG. 2B, positions of the image sensor 40, the front sensor 50 and the rear sensor 60 relative to the original sheet S when viewed from the rear side of the original sheet S being conveyed are shown. As is understood from FIG. 2B, according to the illustrative embodiment, a position in the X-direction subject to detection by the overlap-feeding sensor 30 is a central position, in the X-direction, of the original sheet S being conveyed, that is, a position on a detection line DL indicated by a dotted line in FIG. 2B.

A-2. Code Image Information Generating Process

The code image information generating process is a process of generating the code image information group CI (see FIG. 1). FIG. 3 is a flowchart illustrating the code image information generating process. The code image information generating process is started when a start instruction of this process, which is input by the user through the operation part 150, is obtained. The user may input the start instruction of the code image information generating process in a state where a sample original sheet SS is placed in the sheet feed tray 71.

FIG. 4 shows an example of the sample original sheet SS. On the sample original sheet SS, three kinds of rectangular labels LB a, LBb and LBc are adhered on the original sheet, thereby overlapped and fixed thereon. According to the illustrative embodiment, the "rectangular" shape includes one of which corners are rounded to a certain degree. On each of the labels LBa, LBb and LBc, one or more code images are indicated. The code image is an image expressing encoded information with use of patterns according to a particular rule. The code images include a one-dimensional code indicating information with alternately arranged multiple black lines and white lines (e.g., a barcode) or a two-dimensional code indicating information with tessellated pattern containing a plurality of cells (e.g., the QR code®). For example, a barcode CDa is indicated on the label LBa, a QR code CDb is indicated on the label LBb, and both a QR code CDc and a barcode CDd are indicated on the label LBc.

Each of the barcodes and QR code indicated on the labels LBa, LBb and LBc indicates, for example, information identifying a particular commodity (e.g., a name or number of commodity). For a concrete example, when a pharmacy sells N kinds of medicines (N being an integer more than one) to a customer, N labels including N kinds of barcodes respectively corresponding to the N kinds of medicines are attached to one sheet. Then, by scanning the sheet with the scanner 100 and extracts the information corresponding to each code, management of sold medicines can be done for each customer.

When the start instruction is received, the CPU 110 controls the image reading part 160 to read the sample original sheet SS and generates sample original sheet image data, and receives the thus generated sample original sheet image data from the image reading part 160 (S10).

Then, in S20, the CPU 11 obtains the original sheet image data and identifies code images CDa-CDd within the sample original sheet image SI indicated by the sample original sheet image. The process of identifying the code images (e.g., barcodes and/or QR codes) within an image is a well-known process which is executed in reading devices for such code images. As a result of identifying the code images CDa-CDd, coordinates of four apexes of each of the conde images indicated by black dots in FIG. 4.

In S30, the CPU 110 executes an edge extracting process on the sample original sheet image data to generates edge image data indicating edges within the sample original sheet image SI. The edge extracting process is, for example, a process of applying a well-known edge extracting filter (e.g., the sobel filter or the Prewitt filter) to each pixel value. By executing the edge extracting process, edges indicating outer borders of each of the multiple rectangular labels LBa-LBc within the sample original sheet image SI, and edges indicating outer borders of each of the multiple code images CDa-CDd are extracted.

In S40, the CPU 110 identifies rectangular label areas LIa-LIc respectively corresponding to the rectangular labels LBa-LBc containing code images CDa-CDd. Concretely, the CPU 110 firstly identifies a plurality of candidate lines within the sample original sheet image SI with use of a well-known line detection algorithm (e.g., the Hough transformation or least square approximation). The CPU 110 then excludes outer borders and inner lines of the code images CDa-CDd from the plurality of candidate lines based on the coordinates of the four apexes of each of the code images CDa-CDd. Then, the CPU 110 identifies rectangular areas each of which is defined by the remaining candidate lines and surrounds one or more images of the code images CDa-CDd. Thus identified rectangular areas are identified as the label areas LIa-LIc. In the example shown in FIG. 4, the label area LIa including the barcode CDa, the label area LIb including the QR code CDb, the label area LIc including the QR code CDc and the barcode CDd are identified. As a result of identifying the label areas LIa-LIc, the coordinates of the four apexes of each of the plurality of label areas LIa-LIc (indicated by black dots in FIG. 4) are identified.

In S50, the CPU 110 generates code image information for each of the identified label areas. For example, when the number of the code image included in a label area is one, the CPU 110 calculates distances between four sides of the rectangular label area and corresponding sides of the code image included in the label area, respectively. When multiple code images are included in a label area, the CPU 110 firstly identifies a circumscribed rectangle of the multiple code images, and calculates distances between the four sides of the rectangular label area and the corresponding sides of the circumscribed rectangle, respectively.

In the example shown in FIG. 4, for the label area LIa, a distance Ra between the right side of the label area LIa and the right side of the barcode CDa, a distance Ua between the upper side of the label area LIa and the upper side of the barcode CDa, a distance La between the left side of the label area LIa and the left side of the barcode CDa, and a distance Ba between the lower side of the label area LIa and the lower side of the barcode CDa are calculated. Similarly, for the label area LIb, a distance Rb between the right side of the label area LIb and the right side of the barcode CDb, a distance Ub between the upper side of the label area LIb and the upper side of the barcode CDb, a distance Lb between the left side of the label area LIb and the left side of the barcode CDb, and a distance Bb between the lower side of the label area LIb and the lower side of the barcode CDb are calculated.

Regarding the label area LIc, the circumscribed rectangle CS of the QR code CDc and the barcode CDd is firstly identified. Then, a distance Rc between the right side of the label area LIc and the right side of the circumscribed rectangle CS, a distance Uc between the upper side of the label area LIc and the upper side of the circumscribed rectangle CS, a distance Lc between the left side of the label area LIc and the left side of the circumscribed rectangle CS, and a distance Bc between the lower side of the label area LIc and the lower side of the circumscribed rectangle CS are calculated.

FIG. 5 shows an example of the code image information group CI. As shown in FIG. 5, the CPU 110 generates distance data including four distances Ra, Ua, La and Ba as first code image information CIa corresponding to the label area LIa. Similarly, the CPU 110 generates distance data including four distances Rb, Ub, Lb and Bb as second code image information CIb corresponding to the label area LIb, and distance data including four distances Rc, Uc, Lc and Bc as third code image information CIc corresponding to the label area LIc. The code image information group CI including the thus generated code image information CIa-CIc is stored in the non-volatile storage 130 (see FIG. 1).

According to the code image information generating process described above, by analyzing the sample image data, which is obtained by reading, with the image reading part 160, the sample original sheet SS (see FIG. 4) on which particular fixed objects (e.g., the labels LBa-LBc) are fixed, the code image information CIa-CIc related to the code images CDa-CDd indicated on the labels LBa-LBc fixed on the sample original sheet SS is generated (S20-S50). That is, with use of the sample original sheet SS, the code image information can be generated easily.

A-3. Reading Control Process

The reading control process is a process, which is started based on a reading start instruction by the user, of reading M (M being an integer more than one) original sheets S placed on the sheet feed tray 71 and generating M pieces of read image data respectively representing M original sheets. The reading control process includes a reading process of controlling the image sensor 40 to read the original sheet S being conveyed, and a conveying process of controlling the conveyer 20 to sequentially convey the multiple original sheets S. The reading process and the conveying process are executed in parallel. FIGS. 6A and 6B show a flowchart illustrating the reading control process. It is noted, however, in the flowchart shown in FIG. 6, only the conveying process is indicated and the reading process is not indicated for brevity.

A-3-1. Reading Process

In the reading process, when it is detected that a downstream end, in the conveying direction D, of the original sheet S has reached the position of the rear sensor 60, the CPU 110 starts reading the original sheet S in response to the detection. Further, when it is detected that an upstream end, in the conveying direction D, of the original sheet S has reached the position of the rear sensor 60, the CPU 110 stops reading the original sheet S. By repeating the above processes, the CPU 110 generates a plurality of pieces of read image data for the plurality of original sheets, respectively.

When the original sheet S is being read, the CPU 110 receives read image data based on an output signal of the image sensor 40 for each line from the image sensor 40, and stores the same in the volatile storage 120. When the plurality of pieces of read image data respectively representing the plurality of original sheets S have finally been stored in the volatile storage 120, the plurality of pieces of read image data will be stored as a single read image file (e.g., a PDF file). Then, the read image file is transmitted to a file server 300 and will be stored thereat.

A-3-2. Conveying Process

As described above, FIGS. 6A and 6B shows the reading control process and substantially showing the conveying process although the reading process is executed in parallel.

In S105, the CPU 110 receives the reading start instruction by the user through the operation part 150. Then, the CPU starts measurement with use of the overlap-feeding sensor 30 (S110). After S110, the CPU 110 continuously receives the damping rate DR of the ultrasonic waves based on the output signal of the overlap-feeding sensor 30. As will be described in detail, the CPU 110 can determine whether a portion through which the ultrasonic waves transmitted by the transmitter 31 propagate is the overlapped portion based on the damping rate DR.

In S115, the CPU 110 starts conveying one original sheet S.

It is noted that the overlapped portion is a portion of the original sheet S on which another object is overlapped. According to the present embodiment, the overlapped portion includes a portion on which the label is overlapped with the original sheet S and fixed thereto. The overlapped portion also includes a portion of the original sheet S on which another original sheet S is overlapped as the overlap-feeding is occurring.

FIGS. 7A, 7B, 8A and 8B show examples of measurement results by the overlap-feeding sensor 30 with respect to the original sheet S. In the example shown in FIGS. 7A and 7B, three labels LBe, LBf and LBg are overlapped with the original sheet S and fixed thereto. The detection position of the overlap-feeding sensor 30 is a portion on a one-dotted line DL shown in FIG. 7A and measurement by the overlap-feeding sensor 30 starts from the downstream end (i.e., an upper end in FIG. 7) and moves toward the upstream end (i.e., a lower end in FIG. 7) as the original sheet S1 is conveyed in the conveying direction D. FIG. 7B shows the damping rate DR measured by the overlap-feeding sensor 30.

In S120, the CPU 110 determines whether a length, in the conveying direction D, of the portion of which damping rate DR is equal to or larger than the threshold value TH exceeds the reference length Lth. In the example shown in FIGS. 7A and 7B, when the position, in the conveying direction D, of the detecting portion has reached a position P1, the damping rate DR exceeds the threshold value TH. As the position of the detecting portion in the conveying direction D has reached a position P2, which is on the upstream side from the position P1 by the reference length Lth, with the damping rate DR being kept exceeding the threshold value TH, it is determined that the length, in the conveying direction D, of the portion of which damping rate is equal to or larger than the threshold value TH exceeds the reference length Lth. That is, when the length, in the conveying direction D, of the portion exhibiting the damping rate DR equal to or larger than the threshold value TH exceeds the reference length Lth, the currently detected portion is determined to be the overlapped portion. Whether the detecting position has been moved from the position P1 to the position P2 can be determined by determining whether the conveyed amount of the original sheet S after the detecting position has reached the position P1 (i.e., when the damping rate DR has exceeded the threshold value TH) has reached the reference length Lth based on, for example, a rotation amount of the conveying roller 22. In the following description, the detecting portion subject to detection by the overlap-feeding sensor 30 at the point of time when the length of the overlapped portion in the conveying direction D has exceeded the reference length Lth, that is, the portion determined to be the overlapped portion will also be referred to as an interested detection position.

When the length of the overlapped portion in the conveying direction D has exceeded the reference length Lth (S120: YES), the CPU 110 obtains partial image data indicating a partial image including the interested detection position (e.g., the position P2). For example, the CPU 110 pauses until reading by the image sensor 40 proceeds and partial image data representing a partial image which includes the interested detection position (e.g., position P2) and having a particular width B1 is stored in the volatile storage 120. The particular width B1 is set to be sufficiently wide so that, when a label image exists within the interested detection position, the entire label image is included within the partial image.

In S125, the CPU 110 identifies the code image (e.g., the barcode or the QR code) within the partial image represented by the partial image data which has been obtained. Identification of the codes is performed in accordance with a well-known method as in S320 of FIG. 3. As a result of the identification, according to the example shown in FIGS. 7A and 7B, coordinates of four apexes (indicated by black dots) of a rectangular barcode CDa CDe and an inclination θ are identified.

In S130, the CPU 110 determines whether a code image is identified within the partial image. When no code image is identified within the partial image (S130: NO), it is considered that the overlap-feeding is occurring. In such a case, since it is considered that the label is not overlapped with the original sheet S and fixed thereto at the interested detection position, the reason why the interested detection position is determined to be the overlapped portion is not a label is being overlapped with the original sheet S. Therefore, it is determined that the determination of the overlap-feeding at the interested detection position is made since the overlap-feeding of the original sheets S is actually occurring. Therefore, in this case (S130: NO), the CPU 110 stops driving the discharging rollers 21, the conveying rollers 22, and the sheet feed roller 23 to interrupt conveying of the original sheets S (S145). Further, in S150, the CPU 110 notifies the user of occurrence of the overlap-feeding of the original sheets S. For example, the CPU 110 displays a notification screen indicating a message notifying that the overlap-feeding is occurring and page numbers of the original sheets S which are conveyed in an overlapped manner on the display part 140. After execution of S150, the conveying process is abended. According to the embodiment, the reading process which is executed in parallel with the conveying process is also abended. That is, the reading control process is abended.

When the code image is identified within the partial image (S130: YES), the CPU 110 executes a label detection process in S135. The label detection process is a process of determining whether there exists a label including a code image (e.g., the barcode or the QR code) at the interested detection position by analyzing at least a part of the read image data.

In S140, the CPU 110 determines whether it is determined that the label exists at the interested detection position as a result of the label detection process. When it is determined that there exists a label at the interested detection position (S140: YES), it is considered that the overlap-feeding of the original sheets S is not occurring. In such a case, since the label is overlapped and fixed at the interested detection position, it is determined that the interested detection position is the overlapped position as the label is overlapped with the original sheet S at the interested detection position. Therefore, in this case, the CPU 110 proceeds to S155 without executing process in S145 or S150.

When no label exists at the interested detection position (S140: NO), similarly to a case where the no code image is identified within the partial image (S130: NO), it is considered that the label is not overlapped with the original sheet S at the interested detection position. Therefore, it is determined that the interested detection position is the overlapped position as the overlap-feeding of the original sheets S is actually occurring. Accordingly, in this case, S145 and S150 are executed.

When the length, in the conveying direction D, of the overlapped portion does not exceed the reference length Lth (S120: NO), it is considered that the overlap-feeding of the original sheets S is not occurring. Therefore, in this case, the CPU 110 proceeds to S155.

In S155, the CPU 110 determines whether conveyance of one original sheet S has been completed. When the state of the rear sensor 60 is changed from the ON state, which indicates that the original sheet S exists at the arrangement position of the rear sensor 60, to the OFF state, which indicates that the original sheet S does not exist at the arrangement position of the rear sensor 60, and thereafter, the original sheet S is further conveyed by a particular amount, it is considered that the original sheet S has been discharged onto the discharge tray 72. In such a case, it is determined that conveyance of the original sheet S has been completed.

When conveyance of one original sheet S has not been completed (S155: NO), the CPU 110 returns to S120. When conveyance of one original sheet S has been completed (S155: YES), the CPU 110 determines whether there exists an unconveyed original sheet S in the sheet feed tray 71 (S160). When the front processor 50 is in the ON state, which indicates that there exists an original sheet S in the sheet feed tray 71, it is determined that there exists a unconveyed original sheet S in the sheet feed tray 71. When the unconveyed original sheet S exists in the sheet feed tray 71 (S160: YES), the CPU 110 returns to S115 and starts conveying the next original sheet S. When there exists no unconveyed original sheet S in the sheet feed tray 71 (S160: NO), the CPU 111 terminates the conveying process (i.e., the reading control process).

A-3-3. Label Detection Process

FIG. 9 is a flowchart illustrating the label detection process which is a subroutine called in S135 of FIG. 6B. In S200, the CPU 110 calculates the length L1, in the conveying direction D, of each of the fixed objects based on the detection results of the overlap-feeding sensor 30. Concretely, the CPU 110 calculates the conveying amount of the original sheet S based on the rotation amount of the conveying rollers 22 from a point of time when the damping rate DR exceeds the threshold value TH until the damping rate DR falls below the threshold value TH. Then, the calculated conveying amount is regarded as the length L1 of the fixed object in the conveying direction D. For example, the detection position when it is determined that the length of the overlapped portion in the conveying direction D exceeds the threshold value TH in S120 (FIG. 6A) is a position, in the conveying direction D, where the label LBe is located, the length L1e shown in FIG. 7 is calculated as the length L1 of the fixed object in the conveying direction D.

In S205, the CPU 110 obtains one piece of interested code image information from among the code image information CIa-CIc (FIG. 5) included in the code image information group having been stored in the non-volatile storage 130.

In FIG. 210, the CPU 110 determines a label area with use of the interested code image information. As a result of identification of the label area, coordinates of the four apexes of the determined label area are calculated. FIGS. 10A-10C illustrate identification of the label areas with use of the code image information. In the examples of FIGS. 10A-10C, it is assumed that the code image having been identified in S125 of FIG. 6B is a barcode CDe in FIG. 7.

When the interested code image information is the first code image information CIa (see FIGS. 4 and 5), The label area determined to include the barcode CDe is a label area IAa shown in FIG. 10A. As shown in FIG. 10A, the label area IAa is configured such that four sides thereof are parallel to the corresponding four sides of the barcode CDe, respectively, and distances between the four sides of the label area IAa and the corresponding four sides of the barcode CDe are distances Ua, Ra, Ba and La included in the first code image information CIa.

When the interested code image information is the second code image information CIb (see FIGS. 4 and 5), the label area determined to include the barcode CDe is a label area IAb shown in FIG. 10B. As shown in FIG. 10B, the label area IAb is configured such that four sides thereof are parallel to the corresponding four sides of the barcode CDe, respectively, and distances between the four sides of the label area IAb and the corresponding four sides of the barcode CDe are distances Ub, Rb, Bb and Lb included in the second code image information CIa.

When the interested code image information is the third code image information CIc (see FIGS. 4 and 5), the label area determined to include the barcode CDe is a label area IAc shown in FIG. 10C. As shown in FIG. 10C, the label area IAc is configured such that four sides thereof are parallel to the corresponding four sides of the barcode CDe, respectively, and distances between the four sides of the label area IAc and the corresponding four sides of the barcode CDe are distances Uc, Rc, Bc and Lc included in the third code image information CIa.

The coordinates of the four apexes of the barcode CDe within the label area IAb will be referred to as (x1, y1), (x2, y2), (x3, y3) and (x4, y4), respectively, as indicated in FIG. 10B, and an inclination of the barcode CDe relative to the conveying direction D will be referred to as 0. In this case, coordinates (cx1, cy1), (cx2, cy2), (cx3, cy3) and (cx4, cy4) of the four apexes of the label area IAb to be calculated are expressed with use of following equations (1)-(8).

$$cx1 = x1 + Ub*\sin\theta - Lb*\cos\theta \quad (1)$$

$$cy1 = y1 + Ub*\cos\theta + Lb*\sin\theta \quad (2)$$

$$cx2 = x2 + Ub*\sin\theta + Rb*\cos\theta \quad (3)$$

$$cy2 = y2 + Ub*\cos\theta - Rb*\sin\theta \quad (4)$$

$$cx3 = x3 - Lb*\cos\theta - Bb*\sin\theta \quad (5)$$

$$cy3 = y3 + Lb*\sin\theta - Bb*\cos\theta \quad (6)$$

$$cx4 = x4 - Bb*\sin\theta + Rb*\cos\theta \quad (7)$$

$$cy4 = y4 - Bb*\cos\theta - Rb*\sin\theta \quad (8)$$

As is understood from the equations (1)-(8), based on the four apexes of the code image (e.g., the barcode CDe) and the distances (e.g., Rb, Ub, Lb and Bb) which constitute position information indicative of the position at which the code image is arranged relative to the label, the four apexes of the label area are identified. As a result, the label area can be identified with a high precision, and accordingly, whether the label exists at the interested detection position can be determined with a high precision in S215-S240.

In this example, since the label area LIe corresponding to the label LBe including the barcode CDe (see FIG. 7A) is a label corresponding to the first code image information CIa, distances between the four sides of the barcode CDe and corresponding four sides of the label area LIe coincide with the distances Ua, Ra, Ba and La included in the first code image information CIa. On the other hand, the label area LIe does not correspond to the second code image information CIb or the third code image information CIc. Therefore, the distances between the four sides of the barcode CDe and the corresponding four sides of the label LBe do not coincide with the distances Ub, Rb, Bb and Lb included in the second code image information CIb, or the distances Uc, Rc, Bc and Lc included in the third code image information CIc. Therefore, a label area LIe (FIG. 7A) to be actually identified on the original sheet S1 coincides with the label area IAa (see FIG. 10A) which is identified with use of the first code image information CIa, but does not coincide with a label area IAb (FIG. 10B) or LAc (FIG. 10C) which are identified with use of the second code image information CIb or the third code image information CIc, respectively.

In S215, among the identified four sides of the label area, two sides intersecting with the detection line DL of the overlap-feeding sensor are identified. Identification of the two sides are performed based on the position in the X direction (i.e., the direction perpendicular to the conveying direction D) at which the detection position (i.e., the detection line DL) is positioned. For example, when it is assumed that the label area IAa (FIG. 10A) is the identified label area and the line DL1 (FIG. 10A) is the detection line LD, a left side SDL and a lower side SDB are identified. When it is assumed that the label area IAa (FIG. 10A) is the identified label area and the line DL2 (FIG. 10A) is the detection line LD, an upper side SDU and the lower side SDB are identified. When it is assumed that the label area IAa (FIG. 10A) is the identified label area and the line DL3 (FIG. 10A) is the detection line LD, a right side SDR and a lower side SDB are identified. It could be said that the detection line DL is a phantom line which passes the detection position and extends in parallel with the conveying direction D.

In S220, the CPU 110 calculates a distance L2 between two intersecting points at which the identified two sides intersect with the detection line DL. The length L2 of the two intersecting points is, in other words, a length L2 of the fixed objects based on analysis of the image with use of the code image information CIa-CIc in S205-S220. For example, when it is assumed that the label area IAa shown in FIG. 10A is the identified label area and the line DL1 is the detection line DL, a length (i.e., a distance) L21 between the two intersecting points d1 and d2 is identified. When it is assumed that the label area IAa shown in FIG. 10A is the identified label area and the line DL2 is the detection line DL, a length (i.e., a distance) L22 between the two intersecting points d3 and d4 is identified. When it is assumed that the label area IAa shown in FIG. 10A is the identified label area and the line DL3 is the detection line DL, a length (i.e., a distance) L23 between the two intersecting points d5 and d6 is identified.

As described above, two sides are identified in S215, a length between two intersecting points of the two sides and the detection line DL is identified as a length L2 in S220, even when the label is inclined with respect to the conveying direction D, whether or not there exists a label at the interested detection point can be determined in S225-S240 with a high precision.

In S225, it is determined whether the length L1 of the fixed object which is calculated based on the detection result with use of the overlap-feeding sensor 30 in S200 and the length L2 between the two intersecting points which is calculated in S220 are substantially the same (i.e., L1≈L2). When an absolute value of a difference between the lengths L1 and L2 (i.e., L1-L2) is equal to or less than a particular threshold value ΔE, it is determined that the length L1 and the length L2 are substantially the same.

When there exists the label at the interested detection position, and the length L2 is calculated based on the code image information corresponding to the label area which corresponds to the label at the interested detection position (S210-S220), the length L1 and the length L2 are considered to be substantially the same. Therefore, when the length L1 and the length L2 are substantially the same (S225: YES), the CPU 110 determines that there exists a label at the interested detection position in S240.

When the length L1 and the length L2 are not substantially the same (S225: NO), in S230, the CPU 110 determines whether the CPU 110 has processed all the pieces of code image information included in the code image information group CI as the interested code image information. When there remains unprocessed code image information (S230: NO), the CPU 110 returns to S205 and obtains the unprocessed code image information as the interested code image information.

When it is determined that all the pieces of code image information (S230: YES), there has been no occurrence that the length L1 and the length L2 are substantially the same regardless of the code image information to be used. In such a case, the CPU 110 determines that there is no label at the interested detection position (S235).

After the CPU 110 executes S235 or S245f, the label detection process is terminated.

According to the above-described embodiment, based on the output signal of the overlap-feeding sensor 30, the detection position of the original sheet being conveyed is in the overlap-feeding state (S120). Then, partial image data indicative of a partial image included the image at the interested detection position or the original sheet S is obtained (FIG. 6B, S122). By analyzing the partial image data with use of the code image information CIa-CIc, it is determined whether there exists a label including the code image at the interested detection position (S125-S136 and FIG. 9).

Then, when it is determined that the interested detection position is in the overlap-feeding state based on the output signal of the overlap-feeding sensor 30 (S120: YES), and when it is determined, by analyzing the partial image data, that there exists no label at the interested detection position (S140: NO), conveyance of the original sheet S is interrupted (S145).

When it is determined that the interested detection position is in the overlap-feeding state based on the output signal of the overlap-feeding sensor 30 (S120: YES), and when it is determined, by analyzing the partial image data, that there exists a label at the interested detection position (S140: YES), the conveyance of the original sheet S is continued (S145 being not executed). As a result, it is possible to suppress a defect such that the conveyance of the original sheet S is interrupted due to the label being fixed on the original sheet S regardless of non-occurrence of the overlap-feeding of the original sheets S.

When it is configured that the conveyance of the original sheet S is always interrupted in response to determination, based on the output signal of the overlap-feeding sensor 30, that the interested detection position is in the overlap-feeding state, if the original sheet S on which a label is adhered is used, it is detected falsely that the overlap-feeding of the original sheets S is occurring although it is not actually occurring, and the conveyance of the original sheet S could be interrupted. According to the present embodiment, occurrence of such a malfunction can be suppressed.

Referring to FIGS. 7A and 7B, a case where the overlap-feeding of the original sheet S is not occurring will be described. In such a case, the length L1 of the fixed object which is calculated in S200 based on the detection result of the overlap-feeding sensor 30 is represented as L1$e$, L1$f$ and L1$g$ for the label areas LIe, LIf and LIg corresponding to the labels LBe, LBf and LBg, respectively. The length L2 of the fixed object which is calculated in S205-S220 based on the image analysis is represented as L2$e$, L2$f$ and L2$g$ for the label areas LIe, LIf and LIg, respectively. Further, the above lengths satisfy conditions below.

L1$e$≈L2$e$;

L1$f$≈L2$f$; and

L1$g$≈L2$g$.

Therefore, when the overlap-feeding of the original sheets S is not occurring, it is detected, in the label detection process (S135) that the label exists at the interested detection position (S225: YES, S240, S140: YES) although the length of the overlapped portion exceeds the reference length Lth at positions P2, P3 and P4 in the conveying direction D (S120: YES). As a result, S145 and S150 (FIG. 6B) are not executed, and interruption of the original sheet S does not occur. As above, it is possible to avoid a defect that conveyance of the original sheets S is interrupted due to false detection of the overlap-feeding of the original sheets S although the overlap-feeding is not occurring.

Next, referring to FIGS. 8A and 8B, a case where the overlap-feeding of the original sheets S is occurring will be described. In the example shown in FIG. 8A, the overlap-feeding is occurring. That is, the length L1 is represented as L1$e$ in an upper label area LIe, while L1$h$ in an area where a lower label area LIf, the original sheet S1 and the original sheet S2 overlap. The length L2 of the fixed object which is calculated in S205-S220 based on the image analysis is represented as L2$e$, and represented as L2$f$ for a label area LIf. It is noted that L1$e$≈L2$e$, but L1$h$≉L2$f$.

As a result, when the overlap-feeding of the original sheets S is occurring, the length of the overlapped portions at the positions P5 and P6 in the conveying direction S exceed the reference length Lth (S120: YES). In a process where the position P5 in the conveying direction D is the interested detection position, since L1$e$≈L2$e$, it is determined, in the label detection process (S135), that there exists a label at the interested detection position (S225: YES, S240 and S140: YES). As a result, steps S145 and S150 of FIG. 6 are not executed, and interruption of conveyance of the original sheet S does not occur.

On the other hand, in a process where the position P in the conveying direction D is the interested detection position, since L1$h$≠L2$f$, it is determined, in the label detection process (S135), that there exists no label at the interested detection position (S225: NO, S230: YES, S235 and S140: NO). Therefore, S145 and S150 are executed, and the conveyance of the original sheets S is interrupted. As above, when the overlap-feeding of the original sheets S is occurring, the conveyance of the original sheets S is interrupted appropriately.

It is noted that, according to the present embodiment, the partial image data representing a part of the original sheet S, but not the entire image data, is analyzed in S125-S135 and FIG. 9. Therefore, in comparison with a case where, for example, all the data accumulated from the start of reading is analyzed, load for data analysis can be reduced.

Further, according to the present embodiment, the code image information CIa-Cic include distances (e.g., Ra, Ua, La and Ba) which are information indicating positions at which the barcodes and QR codes are arranged relative to the labels LBa, LBb and LBc (see FIGS. 4 and 5). The CPU 110 is configured to identify the code images within an image indicating the original sheet S1 (S130), and identify the label areas within the image based on the positions of the code images within the image and distances (i.e., position information) (S135, S210). The CPU 110 determines whether a label exists at the interested detection position based on the identifying results of the labels (S215-S240). Thus, with use of the position information indicating positions at which the code images are arranged relative to the label areas, whether the label exists at the interested detection position can be determined with a high precision.

Further, according to the present embodiment, whether or not a label exists at the interested detection position based on the length L1, in the conveying direction D, of the overlapped portion including the interested detection position and the length L2, in the conveying direction D, of the label area (S200, S220-S240). With this configuration, whether or not the label exists at the interested detection position with a high precision.

It is noted that the process of S210-S225 (FIG. 9) is repeated for each of the first code image information CIa, the second code image information CIb and the third code image information CIc. That is, the CPU 110 determines whether a label equivalent to the label LBa shown in FIG. 4 exists at the interested detection position with use of the first code image information CIa, and determines whether a label equivalent to the label LBb shown in FIG. 4 exists at the interested detection position with use of the second code image information CIb. When it is determined that none of the labels LBa-LBc exits at the interested detection position, the CPU 110 interrupts conveyance of the original sheet S, and when it is determined that one of the labels LBa-LBc exits at the interested detection position, the CPU 110 continues conveyance of the original sheet S (S205-S240). Therefore, it is possible to suppress a defect such that conveyance of the original sheet S is interrupted in response to one of the labels LBa-Lbc being fixed to the original sheet S although the overlap-feeding of the original sheets S is not occurring.

As is understood from the above, the image reading part 160 according to the first embodiment is an example of a reading execution part and the CPU 110 and the volatile storage 120 constitute an example of a controlling device.

B. Second Embodiment

B-1. Configuration of Image Processing System 1000B

FIG. 11 is a block diagram showing an image processing system 1000B according to a second embodiment of the present disclosures. The image processing system 1000B includes a scanner 100B and a terminal device 200B which is communicatably connected to the scanner 100B through a network NT.

The scanner 100B is different from the scanner 100 according to the first embodiment in terms of a structure of the non-volatile storage 130B. In the non-volatile storage 130B, a computer program PG1 which is different from the computer program PG shown in FIG. 1 is stored. In the non-volatile storage 130B, the code image information group CI is not stored. The configurations other than the above are the same as those of the scanner 100 according to the first embodiment as shown in FIGS. 1, 2A and 2B. Thus, in FIG. 11, elements same as those of the scanner 100 according to the first embodiment are assigned with the same reference numbers.

By executing the computer program PG1, the CPU 110 executes a scanner side reading control process which will be described later.

The terminal device 200B is a well-known computer such as a personal computer. The terminal device 200B is provided with a CPU 210 serving as a controlling device for controlling the terminal device 200B entirely, a volatile memory 220 such as a DRAM, a non-volatile storage 230 such as a hard disk, a display part 240 such as an LCD, an operating part 250 such a mouth and a keyboard, and a communication I/F 280 used for communicating with another device (e.g., scanner 100B).

The volatile storage 220 is used as a buffer area for temporarily storing data when the CPU 210 executes processes. In the non-volatile storage device 230, the computer program PG2 and the code image information group CI (FIG. 5) are stored. The computer program PG2 is provided such that it is downloaded from a server. Alternatively, the computer program PG2 may be provided such that it is installed in the non-volatile storage 130 at a time of manufacturing, or may be stored in the DVD-ROM or the like. By executing the program PG2, the CPU 110 executes a terminal side reading control process, the conde image information group CI is used in the reading control process.

According to the present embodiment, the scanner 100B and the terminal device 200B are associated with each other to execute the reading control process which is the same as the reading control process execute by the scanner 100 according to the first embodiment.

B-2. Reading Control Process by Scanner

The reading control process executed by the scanner 100B includes a reading process of controlling the image sensor 40 to read the original sheet S being conveyed, and a conveying process of controlling the conveyer 20 to convey the multiple original sheets S sequentially (i.e., one by one). The reading process and the conveying process are executed in parallel.

B-2-1. Reading Process

The reading process will be described in detail. As in the first embodiment, in the reading process, in response to detection that the downstream end, in the conveying direction D, of the original sheet S has reached the position of the rear sensor 60, the CPU 110 starts reading the original sheet S, and in response to detection that the upstream end, in the conveying direction D, of the original sheet S has reached the position of the rear sensor 40, the CPU 110 stops reading the original sheet S. By repeating the above process, the CPU 110 reads the original sheets S one by one. When reading of the original sheet S is being executed, the CPU 110 obtains read image data based on the output signal of the image sensor on a line basis from the image sensor 40, and stores the obtained read image data in the volatile storage 120. The read image data stored in the volatile storage 120 is transmitted to the terminal device 200B together with the damping rate DR in S345 of a conveying process which is described later.

B-2-2. Conveying Process

Next, the conveying process will be described in detail. FIG. 12 is flowchart illustrating the conveying process according to the second embodiment. In S305, the CPU 110 receives the start command, which is transmitted from the terminal device 200. In S310, the CPU 110 starts measuring with use of the overlap-feed sensor 30. Thereafter, the CPU 110 continuously obtains the damping rate DR of the ultrasonic waves base on the output signal of the overlap-feeding sensor 30.

In S320, the CPU 110 determines whether an overlap-feeding notification from the terminal device 200B is received. When it is determined that the overlap-feeding is received (S320: YES), the CPU 110 stops driving of rollers 21, 22 and 23 to stop feeding of the original sheet S, as in S145 of FIG. 6B. Further, in S350, the CPU 110 notifies a user of occurrence of the overlap-feeding, as in S150 of FIG. 6B. After execution of S150S350, the conveying process is abended. In such a case, the reading process which is being executed in parallel with the conveying process is also abended.

When the overlap-feeding notification is not received (S320: NO), the CPU 110 transmits the above-described read image data temporarily stored in the volatile storage 120, the damping rate DR and the page information to the terminal device 200B in a synchronized manner, on a line basis. As shown in FIG. 2B, since the image sensor 40 and the overlap-feeding sensor 30 are arranged at different positions in the conveying direction D, the read image data and the damping rate DR are not synchronized with each other and the damping rate is obtained at a delayed timing. However, in this step, the read image data and the damping rate DR are synchronized, and then transferred to the terminal device 200B.

In S360, the CPU 110 determines whether conveyance of one original sheet S has been completed, as is S155 of FIG. 6B. When it is determined that conveyance of one original sheet S has not been completed (S360: NO), the CPU 110 returns to S320. When it is determined that conveyance of one original sheet S has been completed (S360: YES), the CPU 110 transmits a one-sheet completion notification indicating that conveyance of one original sheet S has been completed to the terminal device 200B in S365. In S370, the CPU 110 determines whether there remains an unconveyed original sheet S in the sheet feed tray 71 as in S160 of FIG. 6A. When it is determined that there remains an unconveyed original sheet S in the sheet feed tray 71 (S370: YES), the CPU 110 returns to S315 and starts conveying the next one original sheet S. When it is determined that there remains no original sheet S in the sheet feed tray 71 (S370: NO), the CPU 110 transmits all-sheet completion notification indicating completion of conveyance of all the original sheets S to the terminal device 200B and terminates the conveying process.

B-3. Reading Control Process of Terminal Device

The reading control process of the terminal device 200B is a process of receiving the image reading data, the damping rate DR and the page information from the scanner 100B, and generating a read image file. The reading control process of the terminal device 200B includes a process of notifying the scanner 100B of occurrence of the overlap-feeding of the original sheets S.

FIGS. 13A and 13B show a flowchart illustrating the reading control process of the terminal device 200B. In S405, the CPU 210 of the terminal device 200B receives the reading start instruction by the user through the operation part 250. In S410, in response to the reading start instruction, the CPU 210 transmits the start command to the scanner 100B. Then, the conveying process in the scanner 100B (described above) is started. In S415, the CPU 210 starts receiving the read image data, the damping rate DR and the page information from the scanner 100B. Such information is transmitted by the scanner 100B in S355 of FIG. 12. The read image data, the damping rate DR and the page information are stored in the volatile storage 220.

In S420, based on the received damping rate DR, it is determined whether the length, in the conveying direction D, of a portion of which damping rate DR is equal to or larger than the threshold value TH exceeds the reference length Lth, as in S120 of FIG. 6A (see FIG. 7). The detected portion detected by the overlap-feeding sensor 30 at a timing when the length, in the conveying direction D, of the overlapped portion exceeds the reference length Lth, that is, the portion detected as the overlapped portion will also be referred to as an interested detection portion.

Processes in S422-S440 are the same as those in S122-S140 in FIG. 6B, and description thereof will be omitted for brevity.

When a code image is not identified within the partial image (S430: NO), or when there exists no label within the interested detection position (S440: NO), it is considered that the overlap-feeding is occurring. In such a case, in S450, the CPU 210 transmits an overlap-feeding notification indicating occurrence of the overlap-feeding of the original sheets S to the scanner 100B. Then, as described above, conveyance of the original sheets S is interrupted (S345 of FIG. 12).

When the length, in the conveying direction D, of the overlapped portion does not exceed the reference length Lth (S420: NO), it is considered that the overlap-feeding of the original sheets S is not occurring. Therefore, in such a case, the CPU 210 advances the process to S455.

When it is determined that there exists a label within the interested detection position (S440: YES), it is considered that no overlap-feeding of the original sheet S is occurring. In such a case, the CPU 210 advances the process to S455.

In S455, the CPU 110210 determines whether one-sheet completion notification is received. When the one-sheet completion notification has not been received (S455: NO), the CPU 210 returns to S420. When the one-sheet completion notification has been received (S455: YES), the CPU 210 determines whether the all-sheet completion notification has been received in S460. When the all-sheet completion notification has not been received (S460: NO), the CPU 210 returns to S420. When the all-sheet completion notification has been received (S460: YES), the read image data indicating all the original sheets S have been received by that timing. The CPU 210 generates one original sheet image data (e.g., a PDF file) with use of the read image data, the CPU 210 terminates the reading control process of the terminal device 200B.

As described above, according to the second embodiment, the terminal device 200B and the scanner 100B cooperate in association with each other to execute the reading control process substantially the same as that in the first embodiment. Thus, according to the second embodiment, the effects same as that of the first embodiment can be obtained.

As understood from the foregoing description, the scanner 100B according to the present embodiment is an example of a scanner and a reading execution part. The overlap-feeding notification according to the present embodiment is an example of an interruption command The terminal device 200B according to the present embodiment is an example of an image processing device.

C. Modifications (1) In each of the above-described embodiments, the overlap-feeding sensor 30 detects the damping rate DR of the ultrasonic waves passing propagating through the original sheets being conveyed. Alternatively, for example, a sensor configured to detect transmittance of light passing through the original sheets being conveyed may be employed. Further alternatively, a micro-displacement sensor configured to measure a thickness of the original sheets being conveyed may be employed. In general, various sensors capable of detecting information on physical characteristics of the original sheets S being conveyed can be used.

(2) In each of the embodiments described above, labels are used as particular fixed objects which are fixed on the original sheet S in an overlapped manner Alternatively or optionally, an IC tag, a seal, a tape, a piece of cloth may be used as the fixed object. Further, in each embodiment, a code image such as a barcode or a QR code is employed as a particular image indicated on the particular fixed object. Alternatively, a particular character(s)/letter(s) or an image of a particular mark or symbol may be used.

(3) In each of the embodiments described above, as a particular image information, information indicating distanced between the four sides of the code image, which is the particular image, and the corresponding four sides of the label are used. Alternatively, for example, when the particular image is a letter or letters, the particular image information may be information indicating the type, size and the number of letters. Further, the information may be one indicating different shapes and sizes of the fixed object depending on the kinds and/or numbers of the letters. In general, as the particular image information, information regarding the particular image, that is, information for identifying a particular image, or information for identifying a fixed object including the particular image may be used.

(4) According to the each embodiment, when the length, in the conveying direction D, of the portion of which damping rate DR is equal to or larger than a threshold value TH exceeds the reference length Lth, partial image data indicative of a partial image including the interested detection position is obtained (S122), and the code image is identified within the partial image (S125). Alternatively, the entire read image data may always be subject to analysis and the code image may be identified within the entire image of the original sheet.

(5) According to each of the above-described embodiment, the label is assumed to be a rectangle. However, the label may have a different shape (e.g., a circle). In such a case, the code image information may be information indicating an arrangement position of the code image within a circular label.

(6) According to each of the above-described embodiments, when the interested detection position is determined to be the overlapped position (S120: YES) and when the length L1 of the fixed object calculate in S200 based on the measurement result of the overlap-feeding sensor 30 and the length L2 of the fixed object calculated in S220 based on the image analysis are substantially the same (S225: YES), it is determined that the label exists at the interested detection position. Alternatively, for example, when the interested detection position is determined to be the overlapped position and when a particular image (e.g., a code image or an image of a particular letter) is identified in the vicinity of the interested detection position, it may be detected that there exists a label including a particular image at the interested detection position.

(7) According to the above-described embodiments, the code image information group CI includes three pieces of code image information CIa-CIc. Alternatively, the number of code image information may be an arbitrary number (e.g., one, two or five). Further, in the label detection process, whether or not a label exists is determined based on one or a plurality of pieces of code image information, designated by a user, from among the plurality of pieces of the code image information CI, and not based on the code image information not designated by the user. The code image information group CI is generated by analyzing the image data of the sample original sheet which is obtained by reading the sample original sheet SS (FIG. 3). Alternatively, the code image information group CI may be generated based on the four distances (e.g., Ua, La, Ra and Ba) input by the user through a particular UI screen.

(8) In each of the embodiments, a part of a configuration realized by a hardware may be replaced with a software. Further, a part of or the all of a configuration realized by a software may be replaced with hardware(s). For example, a part of or all of the processed of the reading process in each of the embodiments described above may be replaced with a hardware such as an ASIC.

It is noted that the embodiments and modifications described above are intended to make understanding of the aspects of the present disclosures, and are not intended to limit the aspects of the disclosures to the configurations of the embodiments and modifications. The aspects of the present disclosures can further be modified in various ways without departing from the aspects of the disclosures.

What is claimed:

1. A scanner, comprising:
a conveyer configured to sequentially convey multiple original sheets along a conveying passage,
an image sensor arranged on the conveying passage and configured to optically read the original sheet being conveyed along the conveying passage,
a detection sensor configured to detect physical information regarding the original sheet being conveyed,
a memory configured to store particular image information regarding a particular image, the particular image being an image indicated on a particular fixed object which is fixed to the original sheet in an overlapped state,
a controller configured to perform:
controlling the conveyor to convey original sheets one by one along the conveying passage;
controlling the image sensor to optically read the original sheet;
determining a detection position of the original sheet based on an output signal of the detection sensor;
obtaining target image data containing at least a partial image of the original sheet at a detection area including the detection position;
determining whether the particular fixed object including the particular image exists at the detection area of the original sheet by analyzing the target image data with use of the particular image information in the memory;
interrupting conveyance of the original sheet by the conveyer when the detection position is determined, based on an output signal of the detection sensor, to be an overlapped position and when it is detected, by analyzing the target image data, that the particular fixed object does not exist at the detection area; and
outputting image data representing an image of the original sheet when the detection position is determined, based on the output signal of the detection sensor, to be the overlapped position and when the detection area is detected, by analyzing the target image data, that the particular fixed object exists at the detection area.

2. The scanner according to claim 1,
wherein the controller is configured to perform:
obtaining the target image data when the detection sensor outputs the output signal indicating that the detection position is the overlapped position.

3. The scanner according to claim 1,
wherein the particular image information includes position information indicating a position where the particular image is arranged relative to the particular fixed object,
wherein the controller is configured to perform:
identifying the particular image within the target image;
identifying an area indicating the particular fixed object within the target image based on a position of the particular image within the target image and the position information; and
determining whether the particular fixed object exists at the detection area based on a result of identification of the area indicating the particular fixed object.

4. The scanner according to claim 3,
wherein the particular image and the particular fixed object are represented by rectangles, respectively,
wherein the second overlap determining part is configured to perform:

identifying each apex of the particular image within the target image;

identifying each apex of the area representing the particular fixed object within the target image based on the each apex of the particular image and the position information; and determining whether the particular fixed object exists at the detection area based on result of identification of each apex of the area.

5. The scanner according to claim 3,
wherein the controller is configured to perform:
identifying a first length, in a conveying direction, of an overlapped portion including the overlapped position;

identifying a second length, in a direction corresponding to the conveying direction, of the area representing the particular fixed object; and determining whether the particular fixed object exists at the detection area based on the first length and the second length.

6. The scanner according to claim 5,
wherein the controller is configured to perform:
identifying two sides of a plurality of sides of the area indicating the particular fixed object within the target image, the two sides being sides with which a virtual line passing the detection position and parallel to the conveying direction intersects based on a position of the detection position in a direction perpendicular to the conveying direction; and identifying a length between two intersection points of the virtual line and each of the two sides as the second length.

7. The scanner according to claim 1,
wherein the memory is configured to store first particular image information and second particular image information,
wherein the controller is configured to perform:
determining whether the first particular fixed object exists at the detection position of the original sheet with use of the first particular image information; and determining whether the second particular fixed object exists at the detection area of the original sheet with use of the second particular image information;

interrupting conveyance of the original sheet by the conveyer when the detection position is determined, based on the output signal of the detection sensor, to be the overlapped position and when it is detected, by analyzing the target image data, that none of the first particular fixed object and the second particular fixed object exists at the detection area; and outputting image data representing the image of the original sheet when the detection position is determined, based on the output signal of the detection sensor, to be the overlapped position and when it is detected, by analyzing the target image data, that one of the first particular fixed object and the second particular fixed object exists at the detection area.

8. The scanner according to claim 1,
wherein the controller is configured to perform:
obtaining sample image data representing a sample original sheet which is the original sheet to which the particular fixed object is fixed;

generating the particular image information regarding the particular image indicated on the particular fixed object fixed to the sample original sheet by analyzing sample image data, determining whether the particular fixed object including the particular image exists at the detection area by analyzing the target image data with use of the generated particular image information.

9. A non-transitory computer-readable recoding medium containing instructions to be executed by a controller of an image processing device, the image processing device is connected to a scanner which is provided with a conveying part, an image sensor, a detection sensor, the conveying part being configured to sequentially convey multiple original sheets along a conveying passage, the image sensor being arranged on the conveying passage and configured to optically read the original sheet being conveyed along the conveying passage, the detection sensor being configured to detect physical information regarding the original sheet being conveyed, the scanner being configured to output read image data based on an output signal of the image sensor, the instructions cause, when executed by the controller, the image processing device to perform:
obtaining particular image information regarding a particular image, the particular image being an image indicated on a particular fixed object which is fixed to the original sheet in an overlapped state;

receiving sensor information based on an output signal of the detection sensor, the sensor information indicating whether or not a detection position of the detection sensor of the original sheet being conveyed is an overlapped position which overlaps with another object;

receiving target image data containing at least a partial image of the original sheet at a detection area including the detection position, the target image data being received from the scanner;

determining whether the particular fixed object including the particular image exists at the detection area of the original sheet by analyzing the target image data with use of the particular image information;

transmitting interruption command to the scanner when the sensor information indicates that the detection position is the overlapped position and when it is determined that a particular fixed object does not exists at the detection area; and generating original sheet image data representing an image of the original sheet with use of the target image data received from the scanner.

10. The non-transitory computer-readable recoding medium according to claim 9,
wherein the instructions cause, when executed by the controller, the image processing device to perform;
obtaining the target image data when the detection sensor outputs the output signal indicating that the detection position is the overlapped position.

11. The non-transitory computer-readable recoding medium according to claim 9,
wherein the particular image information includes position information indicating a position where the particular image is arranged relative to the particular fixed object, wherein the instructions cause, when executed by the controller, the image processing device to perform;
identifying the particular image within the target image;

identifying an area indicating the particular fixed object within the target image based on a position of the particular image within the target image and the position information; and determining whether the particular fixed object exists at the detection area based on a result of identification of the area indicating the particular fixed object.

12. The non-transitory computer-readable medium according to claim 11,
wherein the particular image and the particular fixed object are represented by rectangles, respectively,
wherein the instructions cause, when executed by the controller, the image processing device to perform;
identifying each apex of the particular image within the target image;
identifying each apex of the area representing the particular fixed object within the target image based on the each apex of the particular image and the position information; and
determining whether the particular fixed object exists at the detection area based on result of identification of each apex of the area.

13. The non-transitory computer-readable medium according to claim 11,
wherein the instructions cause, when executed by the controller, the image processing device to perform;
identifying a first length, in a conveying direction, of an overlapped portion including the overlapped position;
identifying a second length, in a direction corresponding to the conveying direction, of the area representing the particular fixed object; and
determining whether the particular fixed object exists at the detection area based on the first length and the second length.

14. The non-transitory computer-readable medium according to claim 13,
wherein the instructions cause, when executed by the controller, the image processing device to perform;
identifying two sides of a plurality of sides of the area indicating the particular fixed object within the target image, the two sides being sides with which a virtual line passing the detection position and parallel to the conveying direction intersects based on a position of the detection position in a direction perpendicular to the conveying direction; and
identifying a length between two intersection points of the virtual line and each of the two sides as the second length.

15. The non-transitory computer-readable medium according to claim 9,
wherein the particular image information includes first particular image information and second particular image information,
wherein the instructions cause, when executed by the controller, the image processing device to perform:
determining whether the first particular fixed object exists at the detection position of the original sheet with use of the first particular image information;
determining whether the second particular fixed object exists at the detection area of the original sheet with use of the second particular image information;
interrupting conveyance of the original sheet by the conveyer when the detection position is determined, based on the output signal of the detection sensor, to be the overlapped position and when it is detected, by analyzing the target image data, that none of the first particular fixed object and the second particular fixed object exists at the detection area; and
outputting image data representing the image of the original sheet when the detection position is determined, based on the output signal of the detection sensor, to be the overlapped position and when it is detected, by analyzing the target image data, that one of the first particular fixed object and the second particular fixed object exists at the detection area.

16. A scanner, comprising:
a conveyer configured to sequentially convey a plurality of original sheets along a conveying passage;
an image sensor arranged on the conveying passage and configured to optically read the original sheet being conveyed along the conveying passage;
a detection sensor configured to detect physical information regarding the original sheet being conveyed;
a communication interface; and
a controller,
wherein the controller is configured to perform:
transmitting read image data based on an output signal of the image sensor to an image processing device through the communication interface;
transmitting sensor information indicating whether or not a detection position, on the original sheet being conveyed, of the detection sensor is an overlapped position overlapping with another object to the image processing device through the communication interface;
receiving interruption command, which is transmitted by the image processing device when the sensor information indicates that the detection position is the overlapped position and when it is determined that a particular fixed object does not exist at the detection position; and
interrupting conveyance of the original sheet by the conveyer when the interruption command is received.

* * * * *